United States Patent
Asukai et al.

(10) Patent No.: US 9,465,971 B2
(45) Date of Patent: Oct. 11, 2016

(54) INFORMATION PROCESSING DEVICE, PROGRAM, AND INFORMATION PROCESSING METHOD

(71) Applicant: SONY CORPORATION, Tokyo (JP)

(72) Inventors: Masamichi Asukai, Kanagawa (JP); Koshiro Mitsuya, Chiba (JP); Atsushi Shionozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/433,508

(22) PCT Filed: Oct. 24, 2013

(86) PCT No.: PCT/JP2013/006286
§ 371 (c)(1),
(2) Date: Apr. 3, 2015

(87) PCT Pub. No.: WO2014/091659
PCT Pub. Date: Jun. 19, 2014

(65) Prior Publication Data
US 2015/0278572 A1    Oct. 1, 2015

(30) Foreign Application Priority Data
Dec. 12, 2012  (JP) ................ 2012-271168

(51) Int. Cl.
G06K 7/10    (2006.01)
G06K 7/14    (2006.01)
G06K 9/22    (2006.01)
G06K 9/32    (2006.01)

(52) U.S. Cl.
CPC .......... *G06K 7/1443* (2013.01); *G06K 7/1417* (2013.01); *G06K 7/1456* (2013.01); *G06K 9/228* (2013.01); *G06K 9/3216* (2013.01)

(58) Field of Classification Search
USPC ....... 235/454, 462.01, 162.09, 462.2, 462.21
See application file for complete search history.

(56) References Cited

U.S. PATENT DOCUMENTS 5,019,699 A * 5/1991 Koenck .............. G06K 7/10633
                                                235/462.2
5,834,749 A * 11/1998 Durbin ............... G06K 7/10722
                                                235/454

(Continued)

FOREIGN PATENT DOCUMENTS

| JP | 2000-148336 | 5/2000 |
| JP | 2006-344066 | 12/2006 |
| JP | 2010-109594 | 5/2010 |

(Continued)

OTHER PUBLICATIONS

Nov. 24, 2015, Japanese Office Action for related JP Application No. 2012-271168.

(Continued)

*Primary Examiner* — Ahshik Kim
(74) *Attorney, Agent, or Firm* — Paratus Law Group, PLLC

(57) ABSTRACT

There is provided an apparatus including an imaging unit configured to capture a current image including an information code, the information code being arranged at an arrangement position corresponding to a location within the captured current image, and a control unit configured to determine a difference between a predetermined position and the arrangement position, wherein, when the determined difference is greater than a predetermined threshold, a notification is output to a user, based on the determined difference, to notify of the difference as a guide for adjusting a capturing position of the current image to thereby move the information code to a new arrangement position corresponding to a location of the predetermined position.

26 Claims, 35 Drawing Sheets

(56) References Cited

U.S. PATENT DOCUMENTS

| | | | |
|---|---|---|---|
| 6,431,452 B2 * | 8/2002 | Feng | 235/462.24 |
| 7,611,059 B2 * | 11/2009 | Kobayashi | G06K 7/1095 |
| | | | 235/454 |
| 2009/0283598 A1 * | 11/2009 | Sherman | G06K 9/3216 |
| | | | 235/404 |
| 2011/0063325 A1 | 3/2011 | Saunders | |
| 2014/0263649 A1 * | 9/2014 | Antognini | G06F 17/30277 |
| | | | 235/454 |

FOREIGN PATENT DOCUMENTS

| | | |
|---|---|---|
| JP | 2011-040008 | 2/2011 |
| WO | WO 2007/141860 A1 | 12/2007 |

OTHER PUBLICATIONS

May 31, 2016, Japanese Office Action for related JP Application No. 2012-271168.

\* cited by examiner

INFORMATION PROCESSING DEVICE, PROGRAM, AND INFORMATION PROCESSING METHOD

CROSS REFERENCE TO PRIOR APPLICATION

This application is a National Stage Patent Application of PCT International Patent Application No. PCT/JP2013/006286 (filed on Oct. 24, 2013) under 35 U.S.C. §371, which claims priority to Japanese Patent Application No. 2012-271168 (filed on Dec. 12, 2012), which are all hereby incorporated by reference in their entirety.

TECHNICAL FIELD

The present disclosure relates to an information processing device, a program, and an information processing method.

BACKGROUND ART

In recent years, with the development of image recognition technology, the use of an information code such as a two-dimensional code has become popular. Specifically, when an information code is printed on a paper medium and an imaging device obtains the captured image of the information code, it is possible to recognize the information code using image recognition and obtain data contained in the information code.

With regard to such information code, various techniques have been considered. For example, Patent Literature 1 discloses a technique for changing a display of a captured image containing an information code on a display screen when the information code is in any position of a plurality of predetermined positions.

CITATION LIST

Patent Literature

[PTL 1]
JP 2009-217834A

SUMMARY

Technical Problem

However, in the related art, if an information code is placed at a predetermined position in a captured image containing the information code, even when a display representation of the captured image on a display screen is changed, the user may not be aware that the information code should be placed at the predetermined position. In addition, it may be time consuming for the user to become aware that the information code should be placed at the predetermined position. Furthermore, in a case where the information code is necessary to be placed in a predetermined arrangement pattern including not only a predetermined position, but also a predetermined size, a predetermined angle, or the like, the user may not be aware of how the information code should be placed in a captured image.

Therefore, it is desirable to provide a configuration capable of being readily aware of how an information code should be placed in a captured image to perform a display control in association with the information code.

Solution to Problem

According to an embodiment of the present disclosure, there is provided an apparatus including an imaging unit configured to capture a current image including an information code, the information code being arranged at an arrangement position corresponding to a location within the captured current image, and a control unit configured to determine a difference between a predetermined position and the arrangement position, wherein, when the determined difference is greater than a predetermined threshold, a notification is output to a user, based on the determined difference, to notify of the difference as a guide for adjusting a capturing position of the current image to thereby move the information code to a new arrangement position corresponding to a location of the predetermined position.

According to another embodiment of the present disclosure, there is provided a method including capturing a current image including an information code, the information code being arranged at an arrangement position corresponding to a location within the captured current image, determining a difference between a predetermined position and the arrangement position, and outputting, when the determined difference is greater than a predetermined threshold, a notification to a user, based on the determined difference, to notify of the difference as a guide for adjusting a capturing position of the current image to thereby move the information code to a new arrangement position corresponding to a location of the predetermined position.

According to another embodiment of the present disclosure, there is provided a non-transitory computer-readable medium embodied with a program, which when executed by a computer, causes the computer to perform a method, the method including capturing a current image including an information code, the information code being arranged at an arrangement position corresponding to a location within the captured current image, determining a difference between a predetermined position and the arrangement position, and outputting, when the determined difference is greater than a predetermined threshold, a notification to a user, based on the determined difference, to notify of the difference as a guide for adjusting a capturing position of the current image to thereby move the information code to a new arrangement position corresponding to a location of the predetermined position.

Advantageous Effects of Invention

According to embodiments of the present disclosure, it is possible to be readily aware of how an information code should be placed in a captured image to perform a display control in association with the information code.

DESCRIPTION OF EMBODIMENTS

It should be understood by those skilled in the art that various modifications, combinations, sub-combinations and alterations may occur depending on design requirements and other factors insofar as they are within the scope of the appended claims or the equivalents thereof.

The description will be given in the following order.
1. Schematic Configuration of Information Processing System
2. Configuration of each Device
2.1. Configuration of Terminal Device
2.2. Configuration of Server
3. Specific Example of Arrangement Pattern Relationship Notification
3.1. Notification of Arrangement Pattern Relationship by displaying on Display Screen
3.2. Notification of Arrangement Pattern Relationship according to Degree of Notification Operation
4. Flow of Processing
5. Modified Example
5.1. Overview of Modified Example
5.2. Configuration of each Device
5.3. Exemplary Arrangement Pattern depending on Information Code
5.4. Flow of Processing
6. Conclusion

1. SCHEMATIC CONFIGURATION OF INFORMATION PROCESSING SYSTEM

Figure 1:
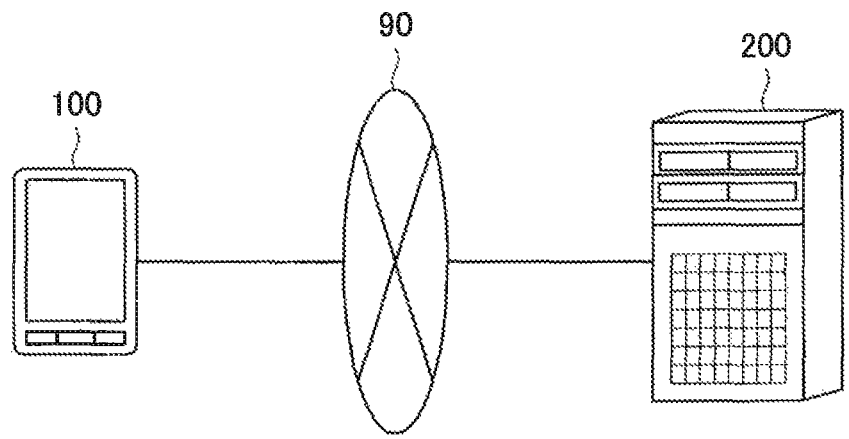
FIG. 1 is an explanatory diagram illustrating an example of a schematic configuration of an information processing system in accordance with an embodiment.

A schematic configuration of an information processing system according to an embodiment of the present disclosure will now be described with reference to FIG. 1. FIG. 1 is an explanatory diagram illustrating an example of a schematic configuration of an information processing system in accordance with the present exemplary embodiment. Referring to FIG. 1, the information processing system includes a terminal device 100 and a server 200. Communication between the terminal device 100 and the server 200 is done via a network 90.

(Terminal Device 100)

The terminal device 100 may be, for example, a smartphone. The terminal device 100 performs a display control that is associated with an information code. For example, when an arrangement pattern of an information code in a captured image containing the information code is a predetermined arrangement pattern, the terminal device 100 performs a display control in association with the information code. As an example, the display control is performed by causing contents associated with an information code to be displayed on a display unit.

More specifically, for example, the terminal device 100 captures an information code and thus generates a captured image containing the information. Subsequently, the terminal device 100, when recognizing the information code in the captured image, detects data contained in the information code. The terminal device 100 then transmits the detected data to the server 200. The terminal device 100 then receives contents associated with the information code (or data contained in the information code) from the server 200. In addition, the terminal device 100 detects an arrangement pattern of the information code in the captured image. The terminal device 100 then displays the contents on a display surface when the arrangement pattern of the information code in the captured image is a predetermined arrangement pattern. For example, the arrangement pattern of an information code includes at least one of position, size, and angle of an information code in a captured image. A specific example of a display control associated with an information code will be described below with reference to FIG. 2.

Figure 2:
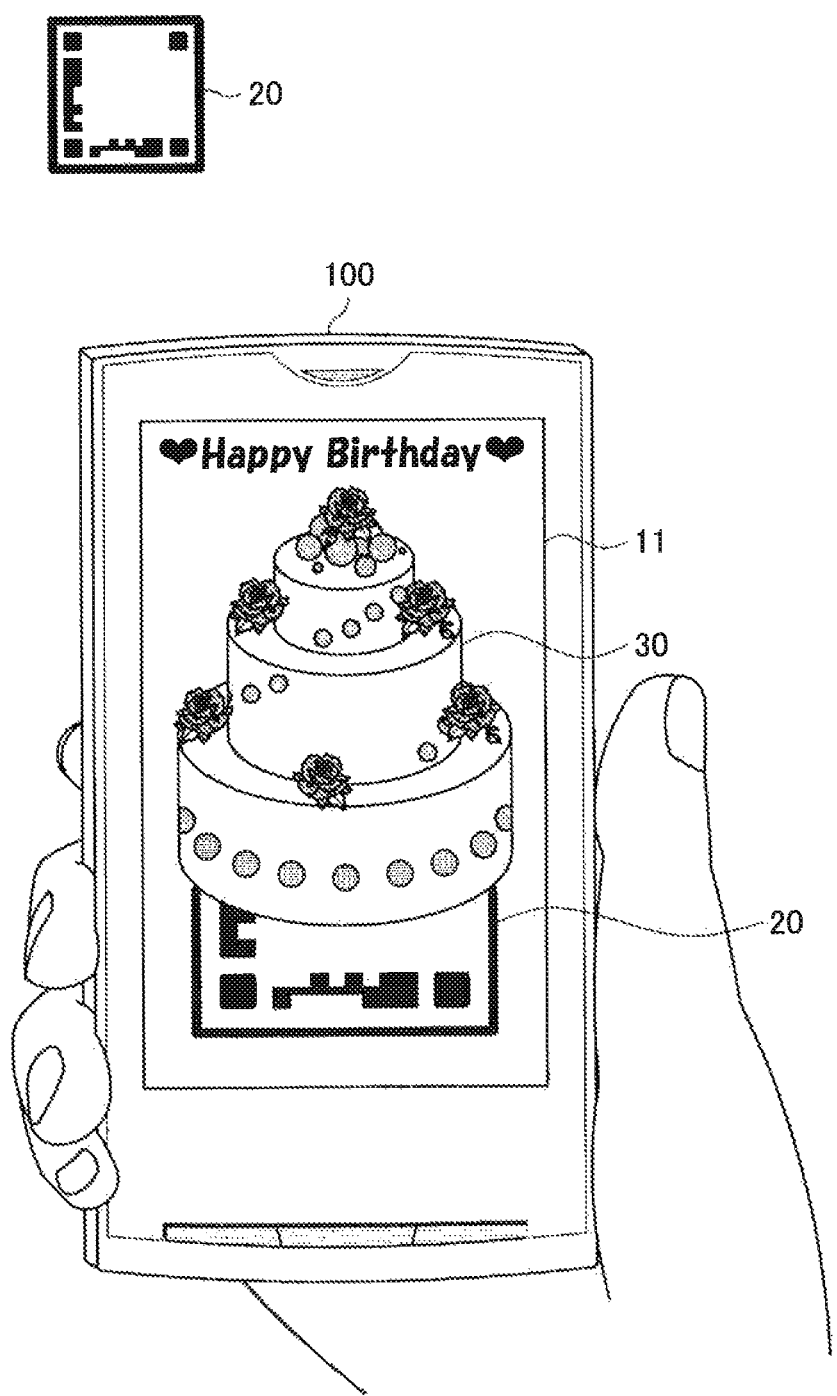
FIG. 2 is an explanatory diagram for explaining an example of a display control associated with an information code.

FIG. 2 is an explanatory diagram for explaining an example of the display control associated with an information code. Referring to FIG. 2, an information code 20 and the terminal device 100 are shown. The terminal device 100 captures an information code 20 and displays a captured image containing the information code 20 on a display surface 11. In addition, the terminal device 100 displays content 30 (content of a birthday cake) associated with the information code 20 on the display surface 11. In this way, in the terminal device 100, the display control is performed in association with the information code 20.

It should be noted that a birthday cake is shown in FIG. 2 as an example of the content 30 associated with the information code 20, but contents associated with the information code 20 are not particularly limited. For example, examples of contents associated with the information code 20 may include texts, still images (e.g., photographs, three-dimensional computer graphics, etc.), moving images (e.g., video, three-dimensional computer graphics animation, etc.), or a sound. In addition, examples of contents associated with the information code 20 may include guidance or advertisement information for the user.

(Server 200)

The server 200 causes the terminal device 100 to perform a display control associated with an information code. For example, the server 200 specifies a display control associated with an information code from data contained in the information code and then causes the terminal device 100 to perform the display control.

More specifically, for example, the server 200 stores a combination of data contained in the information code and contents. The data is associated with the information code on a one-to-one basis, and functions as ID of the information code. The server 200, when receiving data contained in the information code from the terminal device 100, acquires contents associated with the data. The server 200 then transmits the acquired contents to the terminal device 100. As a result, the terminal device 100 displays the contents. In this way, the server 200 causes the terminal device 100 to perform a display control associated with the information code (i.e., to display contents associated with the information code).

As described above, the information processing system includes the terminal device 100 and the server 200. An exemplary configuration of an information code will be described below with reference to FIG. 3.

(Configuration of Information Code)

Figure 3:
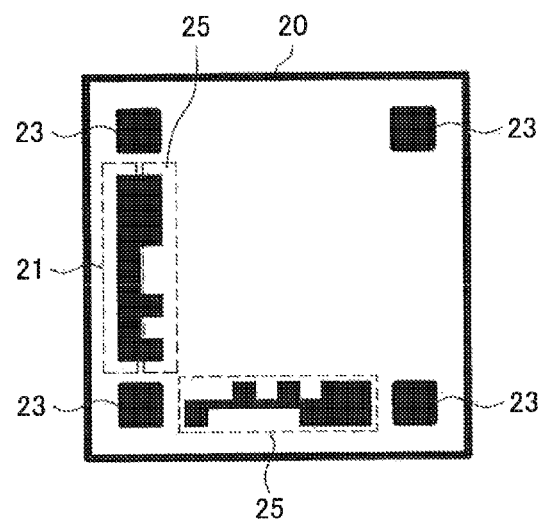
FIG. 3 is an explanatory diagram for explaining an exemplary configuration of an information code.

FIG. 3 is an explanatory diagram for explaining an exemplary configuration of an information code. Referring to FIG. 3, the information code 20 mainly includes a logo mark cell 21, corner cells 23, and data area 25. The terminal device 100 recognizes the logo mark cell 21 and the corner cells 23 and then detects data from arrangement patterns of the cells in the data area 25.

It should be noted that the information code 20 as described above is printed, for example, on a paper medium. Examples of paper media may include posters, business cards, playing cards, calendars, receipts, backing sheet of copy paper, and flyers.

In this exemplary embodiment, as described above, the display control associated with an information code is performed when an arrangement pattern of an information code in a captured image is a predetermined arrangement pattern. According to the exemplary embodiment, the user of the terminal device 100 is able to be readily aware of how the information code should be placed in the captured image to perform the display control associated with the information code. A description will be given in detail as to <<2.

Configuration of each Device>>, <<3. Specific Example of Notification of Arrangement Pattern Relationship>>, and <<4. Flow of Processing>>.

2. CONFIGURATION OF EACH DEVICE

An example of the configuration of the terminal device 100 and the server 200 in accordance with the present exemplary embodiment will be described with reference to FIG. 4 to FIG. 7.

<2.1. Configuration of Terminal Device>

Figure 4:
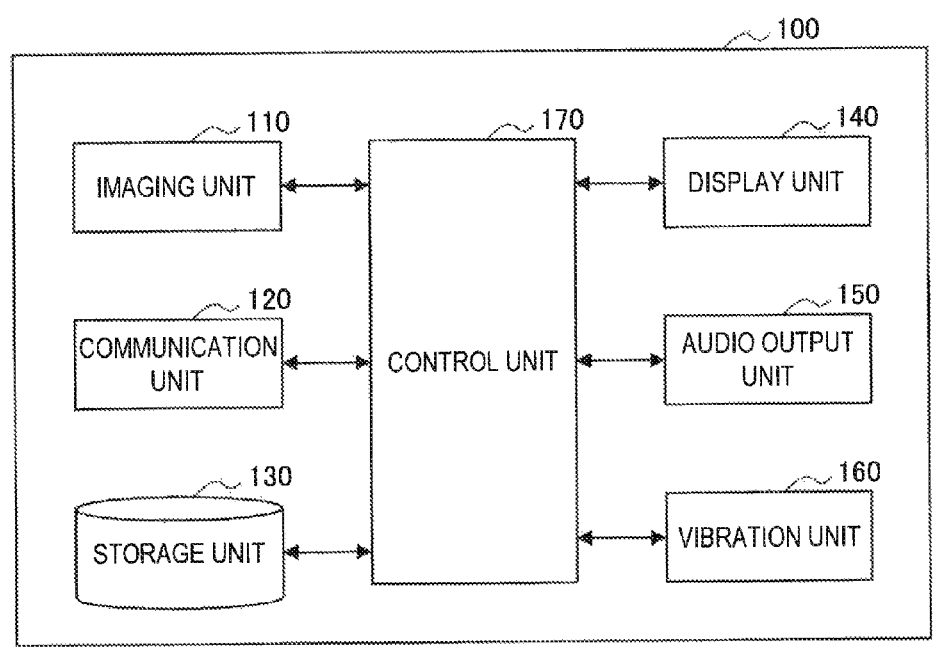
FIG. 4 is a block diagram illustrating an exemplary configuration of a terminal device in accordance with an embodiment.

An example of the configuration of the terminal device 100 in accordance with the present exemplary embodiment will be described with reference to FIG. 4 to FIG. 6. FIG. 4 is a block diagram illustrating an example of the configuration of the terminal device 100 in accordance with the present exemplary embodiment. Referring to FIG. 4, the terminal device 100 includes an imaging unit 110, a communication unit 120, a storage unit 130, a display unit 140, an audio output unit 150, a vibration unit 160, and a control unit 170.

(Imaging Unit 110)

The imaging unit 110 captures a subject and generates a captured image. For example, the imaging unit 110 captures an information code and generates a captured image containing the information code.

The imaging unit 110 includes a photographing optical system such as photographic lens and zoom lens, and an image sensor such as charge-coupled device (CCD) or complementary metal oxide semiconductor (CMOS).

(Communication Unit 120)

The communication unit 120 communicates with other devices. For example, the communication unit 12 communicates with the server 200 via the network 90. As an example, the communication unit 120 communicates with a base station or access point in a wireless manner. The communication unit 120 transmits data to the server 200 via the base station or access point, or receives data from the server 200.

The communication unit 120 includes, for example, an antenna and RF circuit.

(Storage Unit 130)

The storage unit 130 stores a program and data to be used to operate the terminal device 100. The storage unit 130 includes, for example, a storage medium such as a hard disk or semiconductor memory.

(Display Unit 140)

The display unit 140 displays a display screen on a display surface 11 according to the control of the control unit 170. For example, the display unit 140 displays a display screen of a captured image according to the control of the control unit 170. In addition, the display unit 140 displays contents associated with an information code.

Examples of the display unit 140 include a liquid crystal display (LCD) or an organic electro luminescence (EL) display.

(Audio Output Unit 150)

The audio output unit 150 outputs an audio according to the control of the control unit 170. The audio output unit 150 may include a loudspeaker.

(Vibration Unit 160)

The vibration unit 160 vibrates the terminal device 100 according to the control of the control unit 170. In other words, the vibration unit 160 is configured to perform a vibration function of the terminal device 100. The vibration unit 160 may include a vibration motor.

(Control Unit 170)

The control unit 170 performs various functions for the terminal device 100. For example, the control unit 170 may be a processor such as a CPU or DSP, and performs various functions described above by executing a program stored in the storage unit 130 or other storage media.

Display Control in Association with Information Code

For example, the control unit 170 performs a display control in association with an information code. In the present exemplary embodiment, especially, when the arrangement pattern of an information code in a captured image containing the information code is a predetermined arrangement pattern, the control unit 170 performs a display control associated with the information code. As an example, the display control causes the display unit 140 to display contents associated with the information code.

More specifically, for example, when the imaging unit 110 captures an information code and generates a captured image containing the information code, the control unit 170 acquires the captured image. The control unit 170 then recognizes the information code in the captured image and detects data contained in the information code. The control unit 170 then causes the communication unit 120 to transmit the detected data to the server 200. The communication unit 120 receives contents associated with the information code (or data contained in the information code) from the server 200, and thus the control unit 170 acquires the contents. In addition, the control unit 170 detects an arrangement pattern of the information code in the captured image. If the arrangement pattern of the information code in the captured image is a predetermined arrangement pattern, then the control unit 170 causes the display unit 140 to display the contents.

Manifestation of Predetermined Arrangement Pattern

As described above, if an arrangement pattern of an information code in a captured image is a predetermined arrangement pattern, then the control unit 170 causes the display unit 140 to display the contents. For this reason, a predetermined arrangement pattern for performing a display control associated with the information code is displayed on a display screen of the captured image. In other words, the control unit 170 performs the display control so that the predetermined arrangement pattern is displayed on the display screen.

For example, the control unit 170 causes the display unit 140 to display an object that indicates a predetermined arrangement pattern. In this regard, a more detailed description thereof will be given below with reference to FIG. 5.

Figure 5:
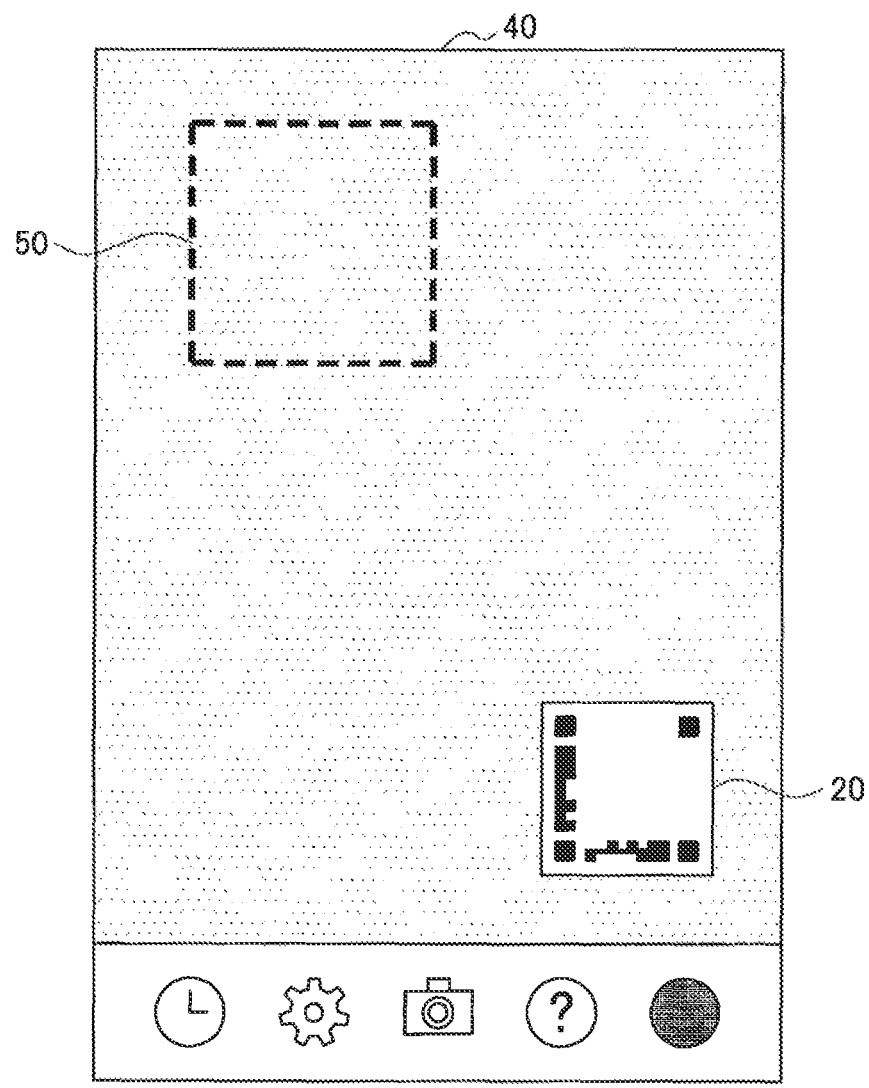
FIG. 5 is an explanatory diagram for explaining an example of an object that indicates a predetermined arrangement pattern.

FIG. 5 is an explanatory diagram for explaining an example of an object that indicates a predetermined arrangement pattern. Referring to FIG. 5, the display screen 40 that is displayed on a display surface 11 of the terminal device 100 is shown. The display screen 40 may be a display screen of a captured image. An information code 20 is included in the captured image. The display screen 40 displays an object 50 that indicate a predetermined arrangement pattern. The object 50 is an object with a rectangular shape.

It should be noted that an object that indicates a predetermined arrangement pattern is not limited to the above example. A more detailed description thereof will be given below with reference to FIG. 6A and FIG. 6B.

Figure 6A:
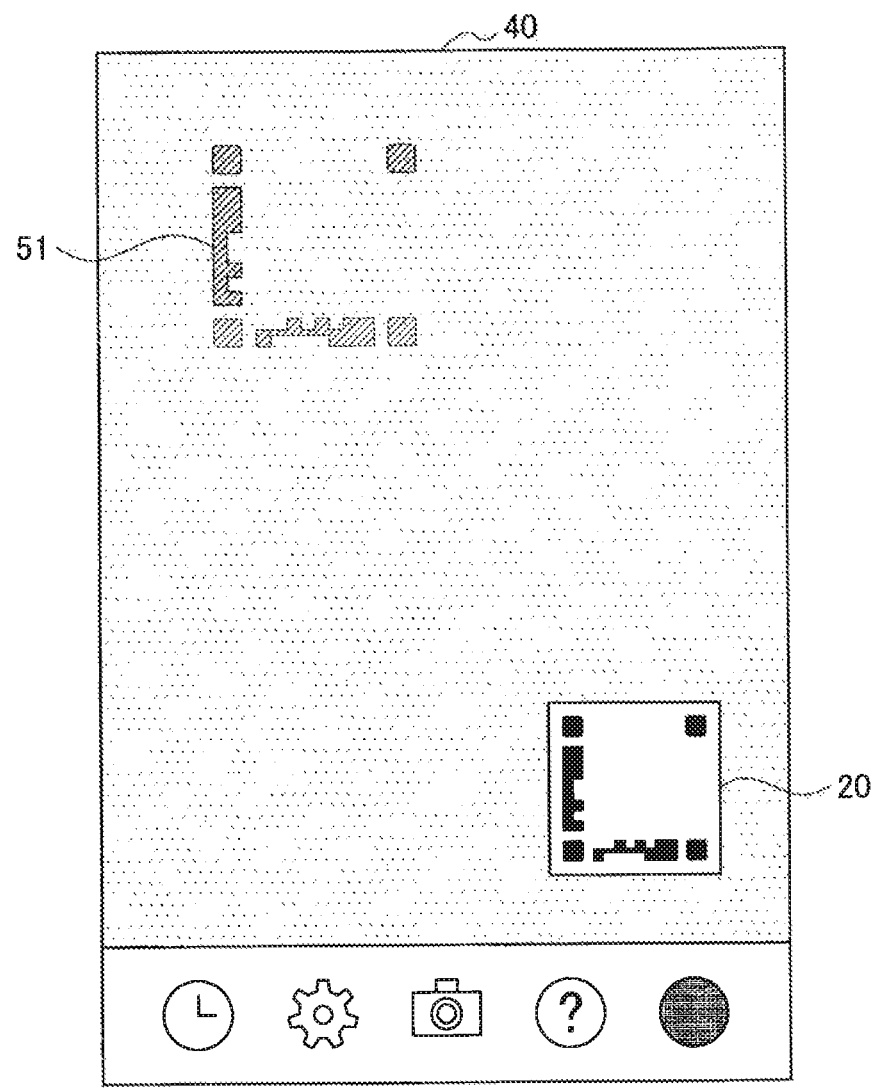
FIG. 6A is an explanatory diagram for explaining another example of the object that indicates a predetermined arrangement pattern.
Figure 6B:
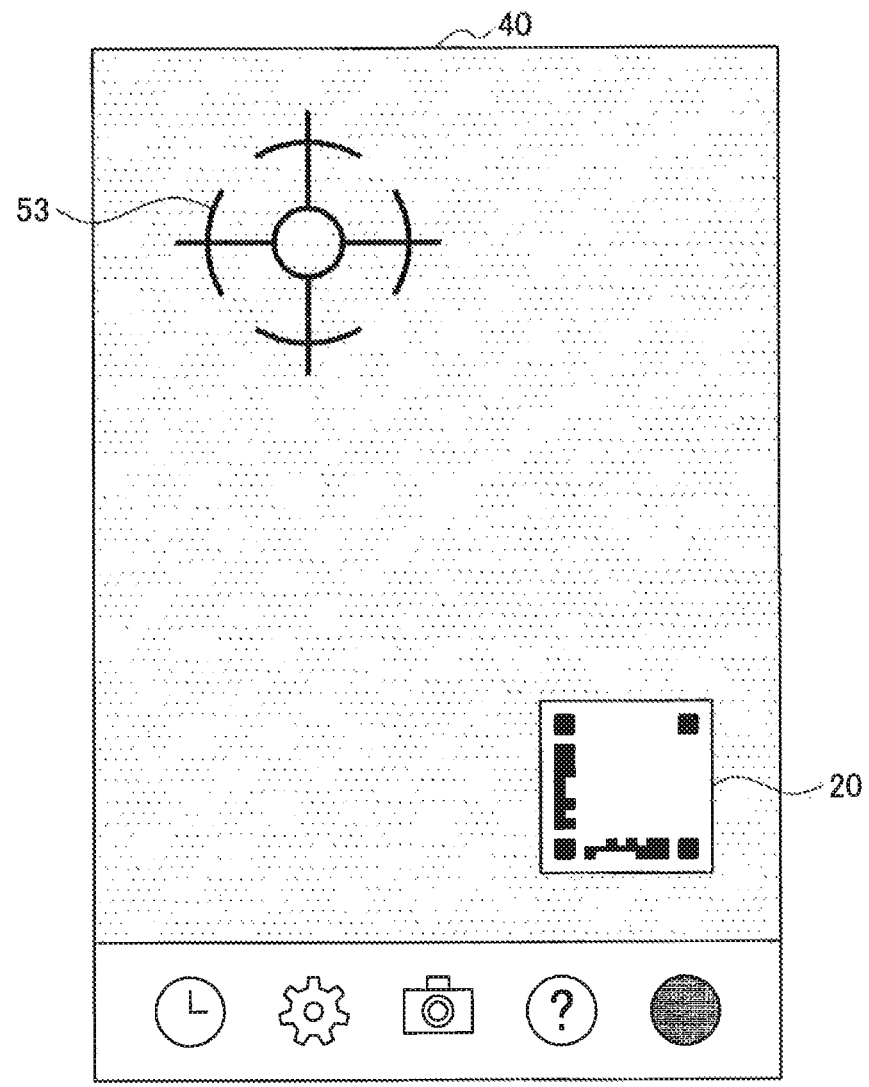
FIG. 6B is an explanatory diagram for explaining another example of the object that indicates a predetermined arrangement pattern.

FIG. 6A and FIG. 6B are explanatory diagrams for explaining another example of an object that indicates a predetermined arrangement pattern. As illustrated in FIG. 6A, for example, an object 51 having a similar shape to that of an information code may be displayed on the display screen 40. In addition, as illustrated in FIG. 6B, for example, a graphical object 53 may be displayed on the display screen 40. In this way, any object that is able to indicate a predetermined arrangement pattern may be applicable.

Furthermore, a predetermined arrangement pattern may be indicated as any form other than an object. A more detailed description thereof will be given below with reference to FIG. 6C.

Figure 6C:
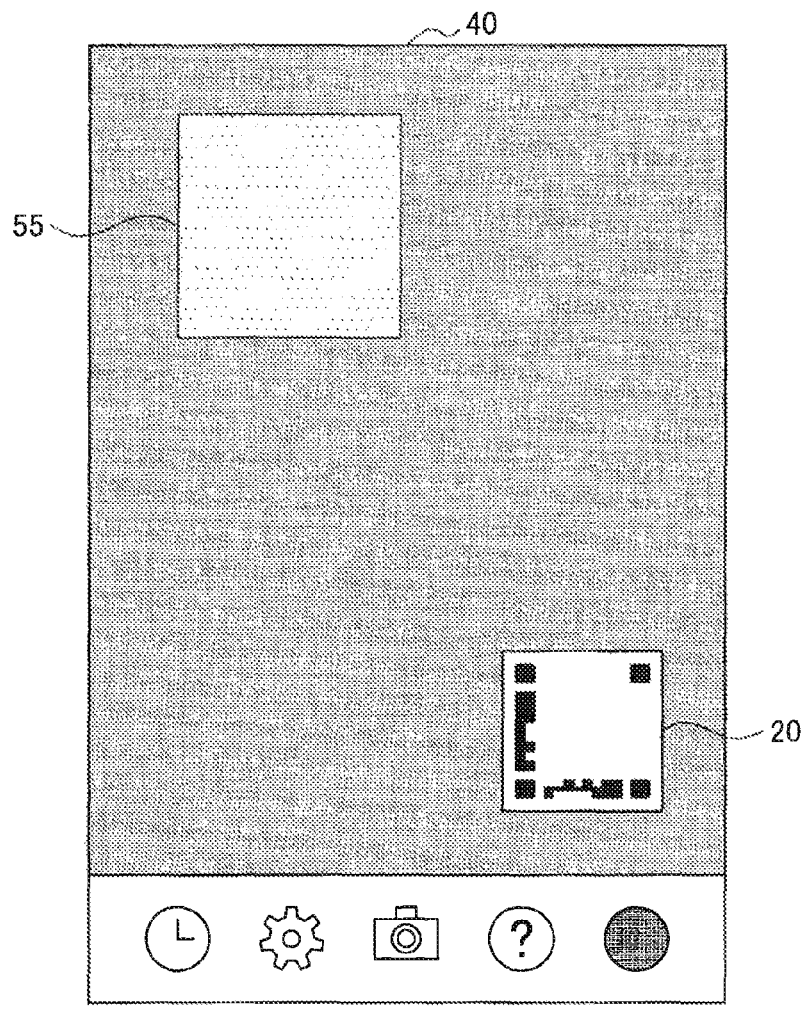
FIG. 6C is an explanatory diagram for explaining another method of displaying a predetermined arrangement pattern on a display screen.

FIG. 6C is an explanatory diagram for explaining an example of another method of displaying a predetermined arrangement pattern on a display screen. As illustrated in FIG. 6C, for example, a predetermined arrangement pattern is indicated by a transparent frame. In other words, the display control is performed in the display screen so that a region indicating an arrangement pattern has higher transparency and other regions have lower transparency. A predetermined arrangement pattern thus may be indicated in any form other than an object.

Notification of Relationship Between Arrangement Pattern of Information Code in Captured Image and Predetermined Arrangement Pattern In the particular exemplary embodiment, the user receives a notification of a relationship between an arrangement pattern of an information code in a captured image that contains the information code and a predetermined arrangement pattern for performing a display control associated with the information code.

First, the control unit 170 acquires a relationship between an arrangement pattern of an information code in a captured image that contains the information code and a predetermined arrangement pattern for performing a display control associated with the information code (hereinafter, this relationship will be referred to as "arrangement pattern relationship").

More specifically, for example, as described above, the control unit 170 detects an arrangement pattern of an information code in a captured image. The control unit 170 then calculates the difference between the arrangement pattern of the information code in the captured image and the predetermined arrangement pattern as the above-mentioned arrangement pattern relationship. In this way, the control unit 170 acquires the relationship.

For example, the arrangement pattern of the information code in the captured image includes a position of the information code in the captured image, and the predetermined arrangement pattern includes a predetermined position. The arrangement pattern relationship includes a positional relationship between the position of the information code in the captured image and the predetermined position. In this case, for example, the control unit 170 calculates the difference between the position of the information code in the captured image and the predetermined position as the positional relationship.

It should be noted that the arrangement pattern of the information code in the captured image may include the size of the information code in the captured image, and the predetermined arrangement pattern may include the predetermined size. The arrangement pattern relationship may include a size relationship between the size of the information code in the captured image and the predetermined size. In addition, the arrangement pattern of the information code in the captured image may include an angle of the information code in the captured image, and the predetermined arrangement pattern may include a predetermined angle. The arrangement pattern relationship may include an angular relationship between the angle of the information code in the captured image and the predetermined angle.

Secondly, the control unit 170 controls a notification of the arrangement pattern relationship (hereinafter, it will be referred to as "arrangement pattern relationship notification") for the user. For example, the control unit 170 notifies the arrangement pattern relationship to the user of the terminal device 100 using any method. In this regard, a more detailed description thereof will be given later in connection with <<3. Specific Example of Arrangement Pattern Relationship Notification>>.

<2.2. Configuration of Server>

Figure 7:
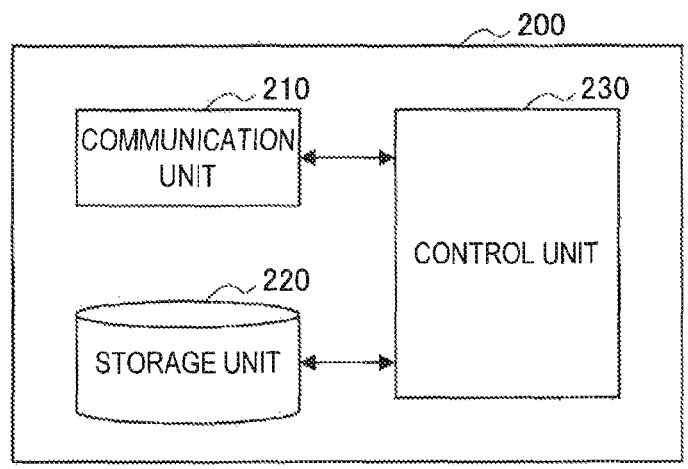
FIG. 7 is a block diagram illustrating an exemplary configuration of a server in accordance with an embodiment.

An exemplary configuration of the server 200 in accordance with the present exemplary embodiment will now be described with reference to FIG. 7. FIG. 7 is a block diagram illustrating an exemplary configuration of the server 200 in accordance with the present exemplary embodiment. Referring to FIG. 7, the server 200 includes a communication unit 210, a storage unit 220, and a control unit 230.

(Communication Unit 210)

The communication unit 210 communicates with other devices. For example, the communication unit 210 communicates with the terminal device 100 via the network 90. As an example, the communication unit 210 includes a communication interface used to perform wired communications.

(Storage Unit 220)

The storage unit 220 stores a program and data to be used to operate the server 200. The storage unit 220 includes, for example, a storage medium such as a hard disk or semiconductor memory.

For example, the storage unit 220 stores a combination of data contained in an information code and contents associated with the information code. In this way, the data is associated with the contents, and thus the information code is associated with the contents. Note that the data is associated with the information code, for example, on a one-to-one basis, and functions as ID of the information code.

(Control Unit 230)

The control unit 230 performs various functions for the server 200. For example, the control unit 230 may be a processor such as a CPU or DSP, and performs various functions described above by executing a program stored in the storage unit 220 or other storage media.

Instruction of Display Control Associated with Information Code

For example, the control unit 230 causes the terminal device 100 to perform a display control associated with the information code. For example, the control unit 230 specifies a display control associated with an information code from data contained in the information code and causes the terminal device 100 to perform the display control.

More specifically, for example, when the communication unit 210 receives data contained in the information code from the terminal device 100, the control unit 230 acquires contents associated with the data from the storage unit 220. The control unit 230 causes the communication unit 210 to transmit the contents to the terminal device 100. As a result, the terminal device 100 displays the contents. In this way, the server 200 causes the terminal device 100 to perform a display control associated with the information code (i.e., to display contents associated with the information code).

3. SPECIFIC EXAMPLE OF ARRANGEMENT PATTERN RELATIONSHIP NOTIFICATION

As described above, in the present exemplary embodiment, the user receives a notification of a relationship (i.e., an arrangement pattern relationship) between an arrangement pattern of an information code in a captured image that contains the information code and a predetermined arrangement pattern for performing a display control associated with the information code. A detailed description of a notification of the arrangement pattern relationship will be given below.

<3.1. Notification of Arrangement Pattern Relationship by Displaying it on Display Screen>

The arrangement pattern relationship is notified, for example, by displaying it on a display screen. In other words, a notification of the arrangement pattern relationship (i.e., the arrangement pattern relationship notification) to the user may include a notification of the arrangement pattern relationship by displaying it on a display screen of a captured image. In this case, the control unit 170 of the terminal device 100 controls the notification of the arrangement pattern relationship to the user by causing the display unit 140 to display a display screen for notifying the arrangement pattern relationship.

(Arrangement Pattern Relationship Notification by Displaying Object)

For example, the arrangement pattern relationship notification includes a notification of the arrangement pattern relationship that is implemented by displaying the object corresponding to the arrangement pattern relationship on the display screen of the captured image.

Object Indicating Arrangement Pattern Relationship

As an example, the object corresponding to the arrangement pattern relationship is an object that indicates the arrangement pattern relationship. A more detailed description thereof will be described below with reference to FIG. 8A, FIG. 8B, FIG. 8C, and FIG. 8D.

Figure 8A:
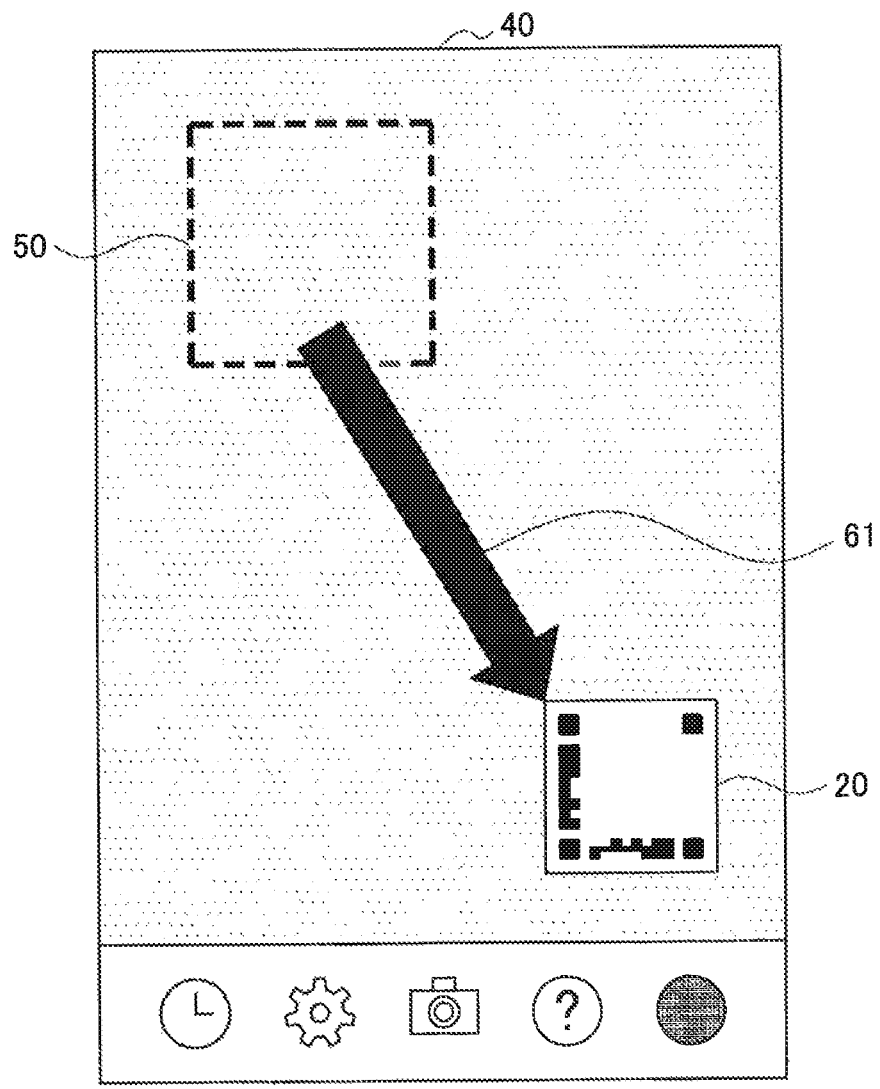
FIG. 8A is an explanatory diagram for explaining a first example of an object that indicates a relationship between an arrangement pattern of an information code in a captured image and a predetermined arrangement pattern.

FIG. 8A is an explanatory diagram for explaining a first example of an object that indicates a relationship between an arrangement pattern of an information code in a captured image and a predetermined arrangement pattern (i.e. an arrangement pattern relationship). Referring to FIG. 8A, an object 50 that indicates a predetermined arrangement pattern is illustrated in a display screen 40 of a captured image. In addition, an information code 20 in the captured image is also illustrated. In this example, the information code 20 in the captured image has a position different from a predetermined position (in other words, a position of the object 50) in the predetermined arrangement pattern. For this reason, for example, a object 61 represented by the arrow indicating the direction (the lower right direction) toward the position of the information code 20 in the captured image from the position of the object 50 is displayed on the display screen 40 as the object indicating the arrangement pattern relationship.

Figure 8B:
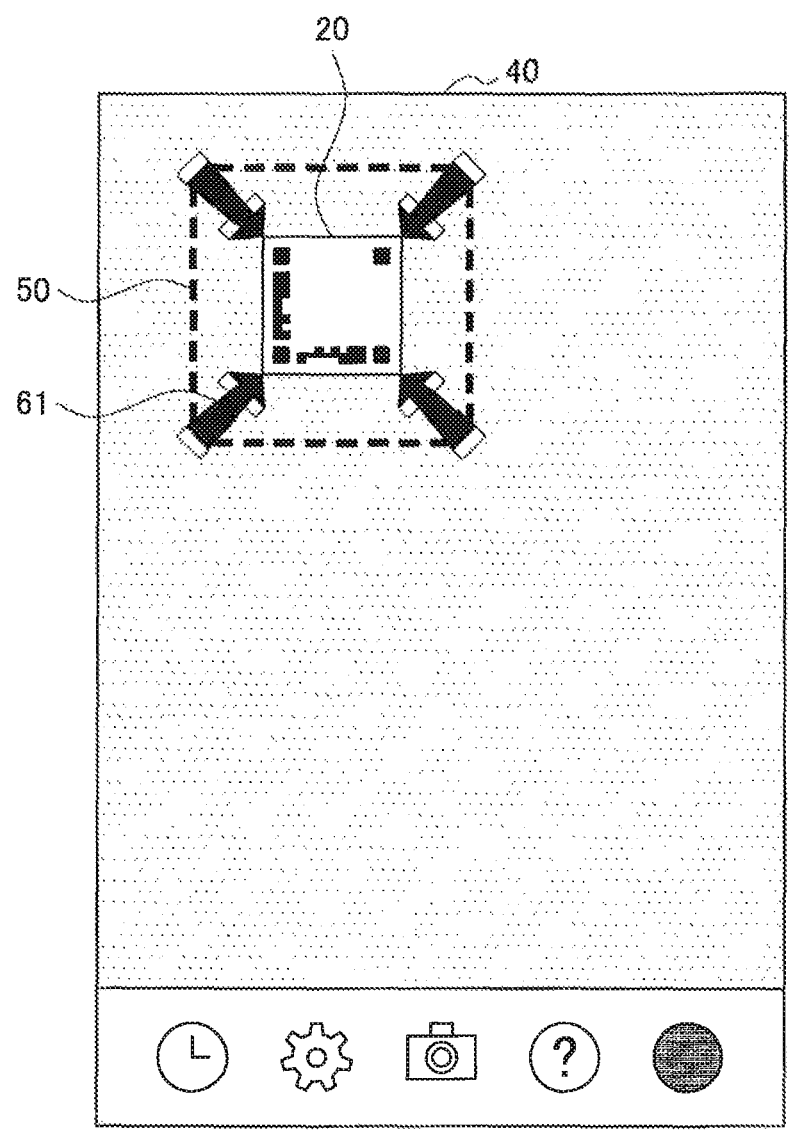
FIG. 8B is an explanatory diagram for explaining a second example of the object that indicates a relationship between an arrangement pattern of an information code in a captured image and a predetermined arrangement pattern.

FIG. 8B is an explanatory diagram for explaining a second example of the object that indicates the relationship between the arrangement pattern of the information code in the captured image and the predetermined arrangement pattern (in other words, the arrangement pattern relationship). In this example, the information code 20 in the captured image has a size different from a predetermined size (in other words, size of the object 50) of the predetermined arrangement pattern. For this reason, for example, an object 61 represented by the arrow indicating the direction (the depth direction) toward the information code 20 in the captured image from the object 50 is displayed on the display screen 40 as the object indicating the arrangement pattern relationship.

Figure 8C:
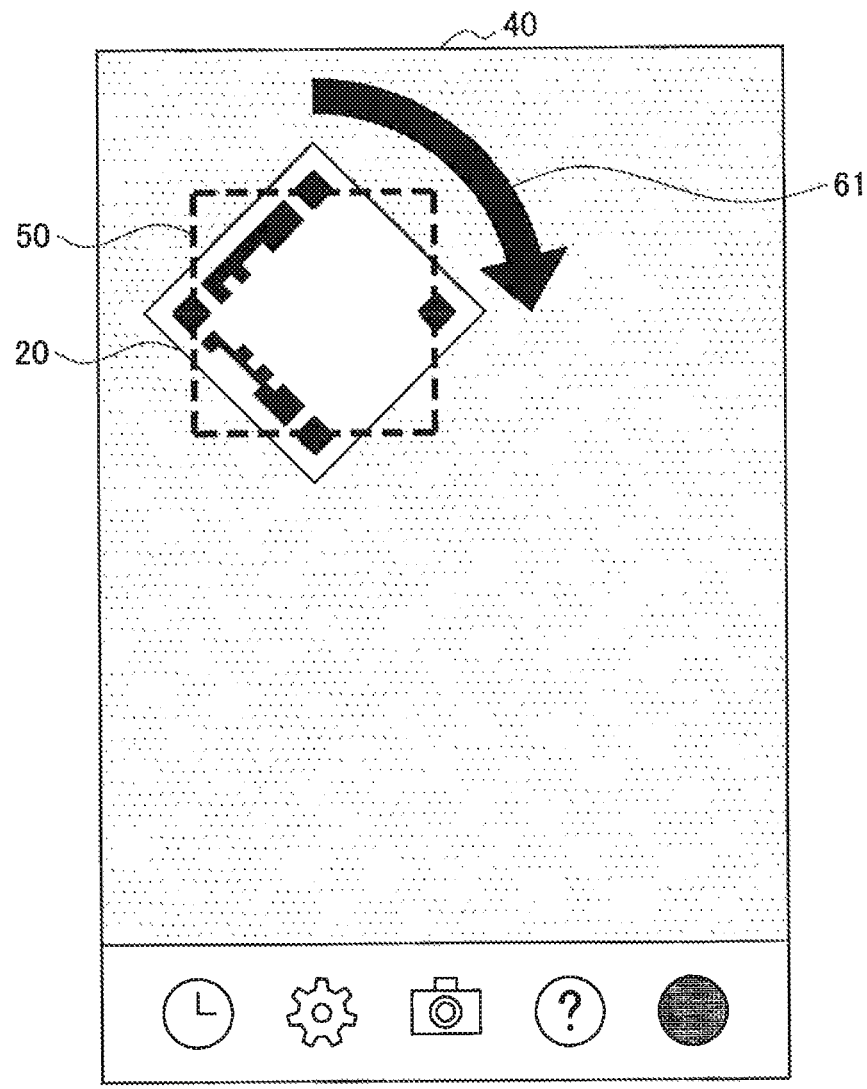
FIG. 8C is an explanatory diagram for explaining a third example of the object that indicates a relationship between an arrangement pattern of an information code in a captured image and a predetermined arrangement pattern.

FIG. 8C is an explanatory diagram for explaining a third example of the object that indicates the relationship between the arrangement pattern of the information code in the captured image and the predetermined arrangement pattern (i.e., the arrangement pattern relationship). In this example, the information code 20 in the captured image has an angle (a slope) different from an angle (in other words, angle of the object 50) of the predetermined arrangement pattern. For this reason, for example, an object 61 represented by the arrow indicating the direction (the clockwise direction) toward the angle of the information code 20 in the captured image from the angle of the object 50 is displayed on the display screen 40 as the object indicating the arrangement pattern relationship.

Figure 8D:
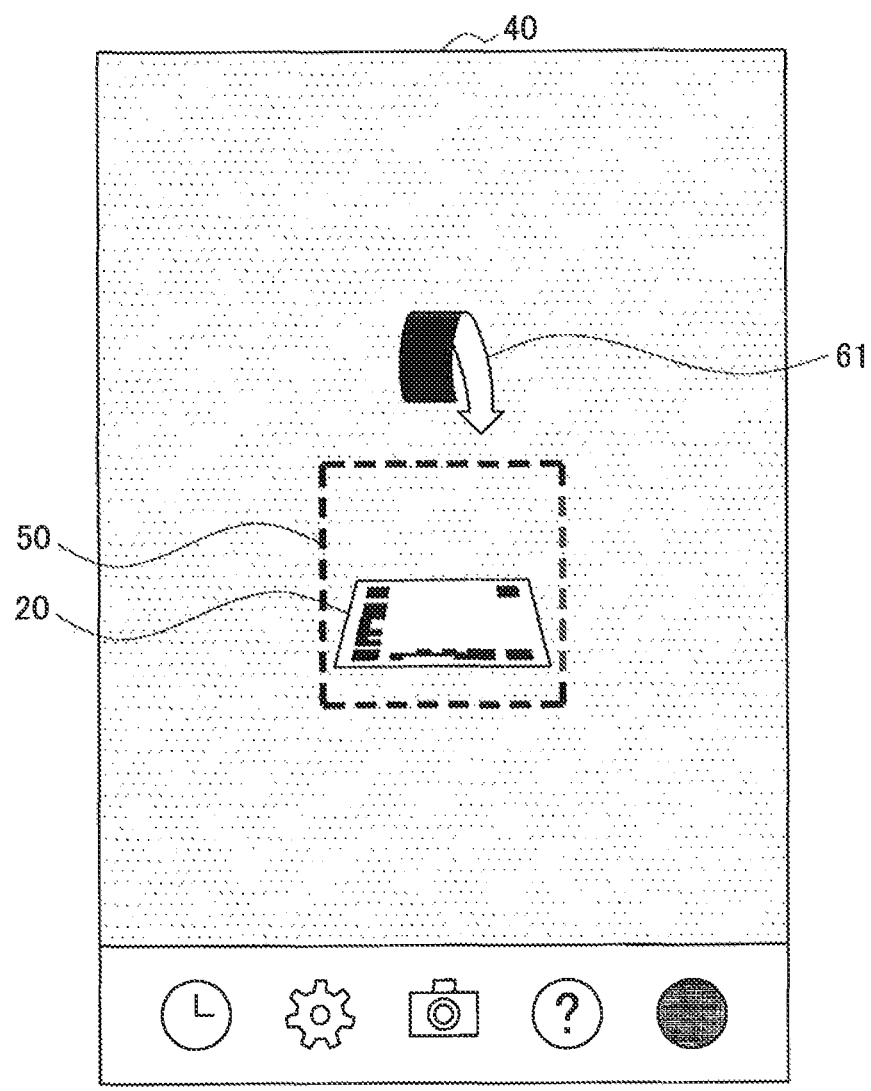
FIG. 8D is an explanatory diagram for explaining a fourth example of the object that indicates a relationship between an arrangement pattern of an information code in a captured image and a predetermined arrangement pattern.

FIG. 8D is an explanatory diagram for explaining a fourth example of the object that indicates the relationship between the arrangement pattern of the information code in the captured image and the predetermined arrangement pattern (i.e., the arrangement pattern relationship). In this example, the information code 20 in the captured image has an angle (a slope) different from an angle (in other words, angle of the object 50) of the predetermined arrangement pattern. For this reason, for example, an object 61 represented by the arrow indicating the direction (rotation about the depth direction) toward the angle of the information code 20 in the captured image from the angle of the object 50 is displayed on the display screen 40 as the object indicating the arrangement pattern relationship.

Object with Movement Indicating Arrangement Pattern Relationship

As another example, the object corresponding to the arrangement pattern relationship is an object with a movement that indicates the arrangement pattern relationship. A more detailed description thereof will be given below with reference to FIG. 9A, FIG. 9B, and FIG. 9C.

Figure 9A:
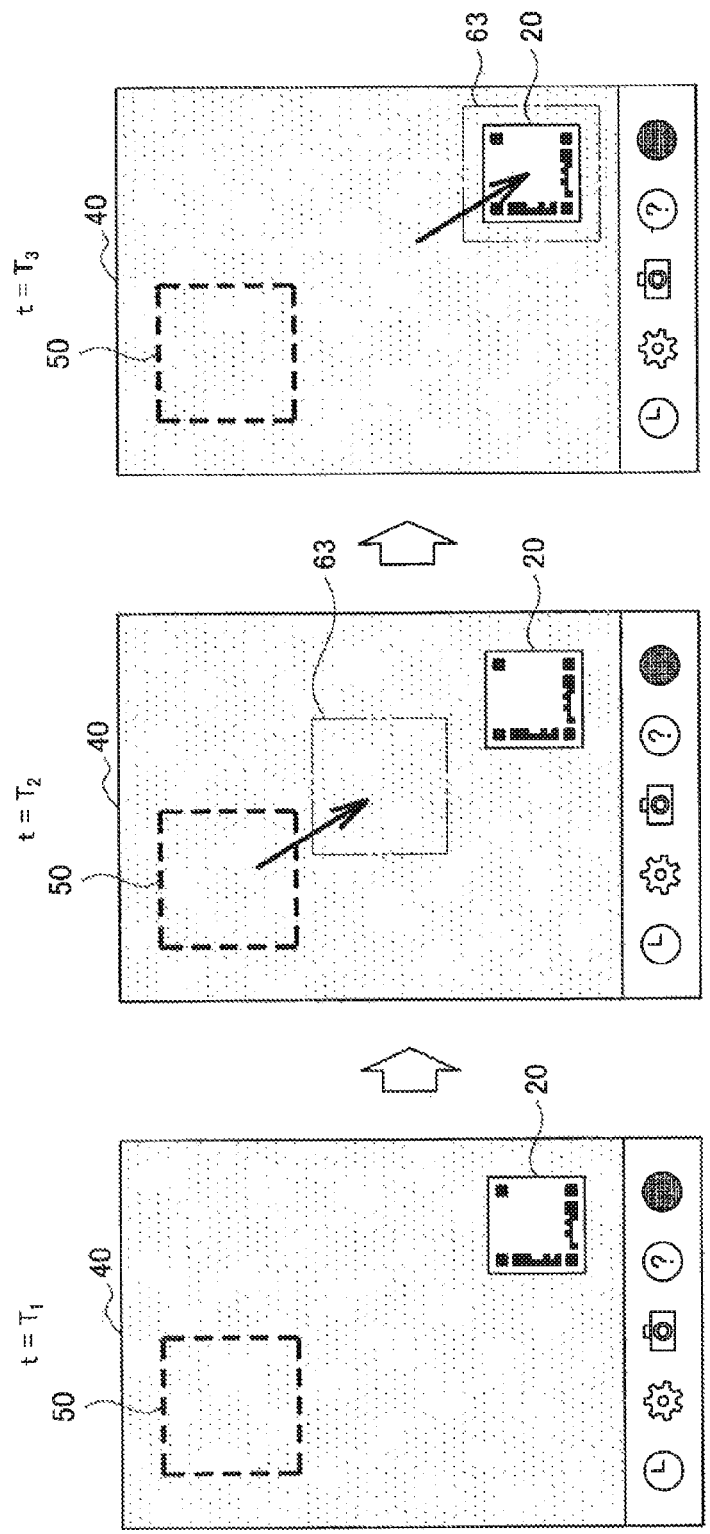
FIG. 9A is an explanatory diagram for explaining a first example of an object with a movement that indicates a relationship between an arrangement pattern of an information code in a captured image and a predetermined arrangement pattern.

FIG. 9A is an explanatory diagram for explaining a first example of an object with a movement that indicates a relationship between an arrangement pattern of an information code in a captured image and a predetermined arrangement pattern (i.e., an arrangement pattern relationship). Referring to FIG. 9A, the display screen 40 of the captured image at each time of $T_1$, $T_2$, and $T_3$ is illustrated. In the display screen 40, an object 50 that indicates a predetermined arrangement pattern is illustrated. The information code 20 in the captured image is also illustrated. In this example, similarly to the example of FIG. 8A, the information code 20 in the captured image has a position different from a predetermined position (in other words, the position of the object 50) of the predetermined arrangement pattern. For this reason, for example, an object 63 with the movement in the direction (the lower right direction) toward the position of the information code 20 in the captured image from the position of the object 50 is displayed on the display screen 40 as the object with the movement indicating the arrangement pattern relationship.

Figure 9B:
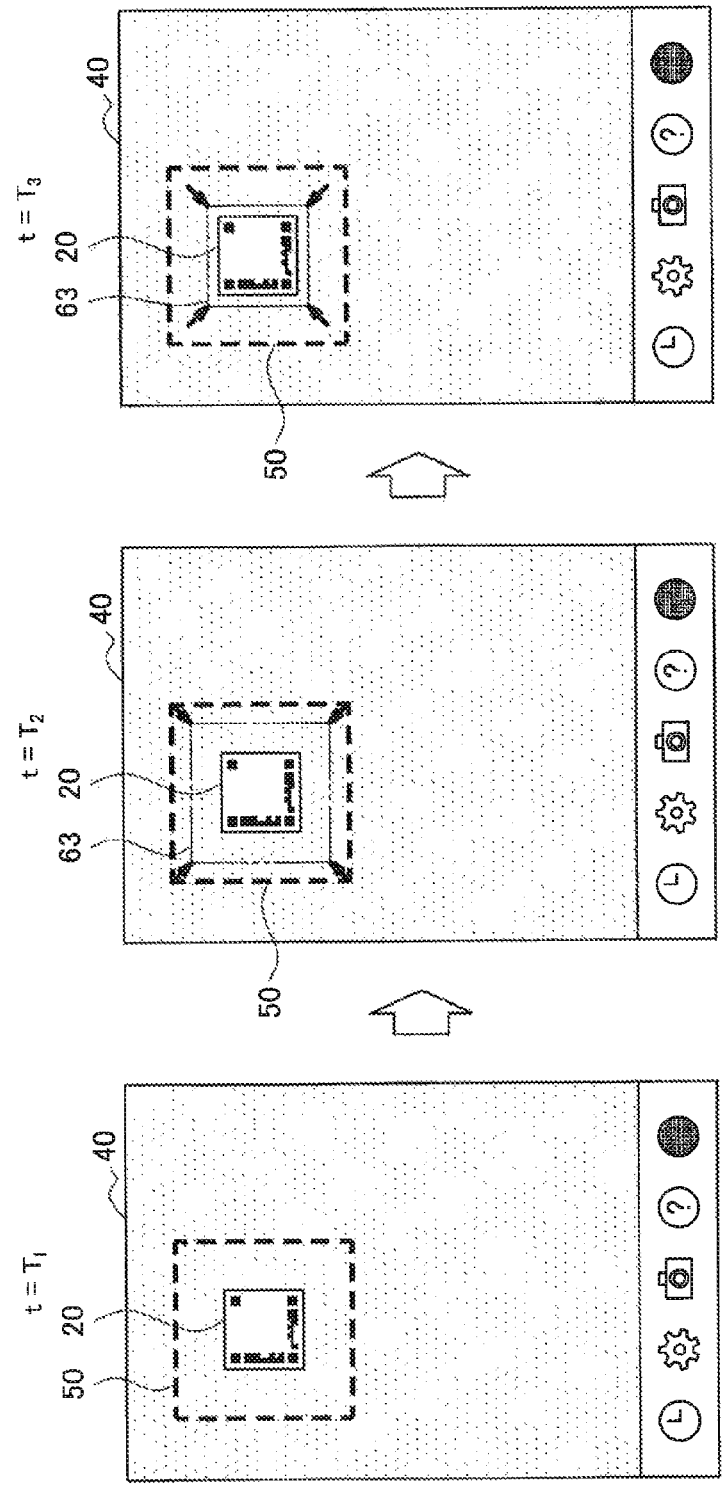
FIG. 9B is an explanatory diagram for explaining a second example of the object with a movement that indicates a relationship between an arrangement pattern of an information code in a captured image and a predetermined arrangement pattern.

FIG. 9B is an explanatory diagram for explaining a second example of the object with the movement that indicates the relationship between the arrangement pattern of the information code in the captured image and the predetermined arrangement pattern (i.e., the arrangement pattern relationship). In this example, similarly to the example of FIG. 8B, the information code 20 in the captured image has a size different from a predetermined size (in other words, the size of the object 50) of the predetermined arrangement pattern. For this reason, for example, an object 63 with the reduction from the size of the object 50 to the size of the information code 20 in the captured image is displayed on the display screen 40 as the object with the movement indicating the arrangement pattern relationship.

Figure 9C:
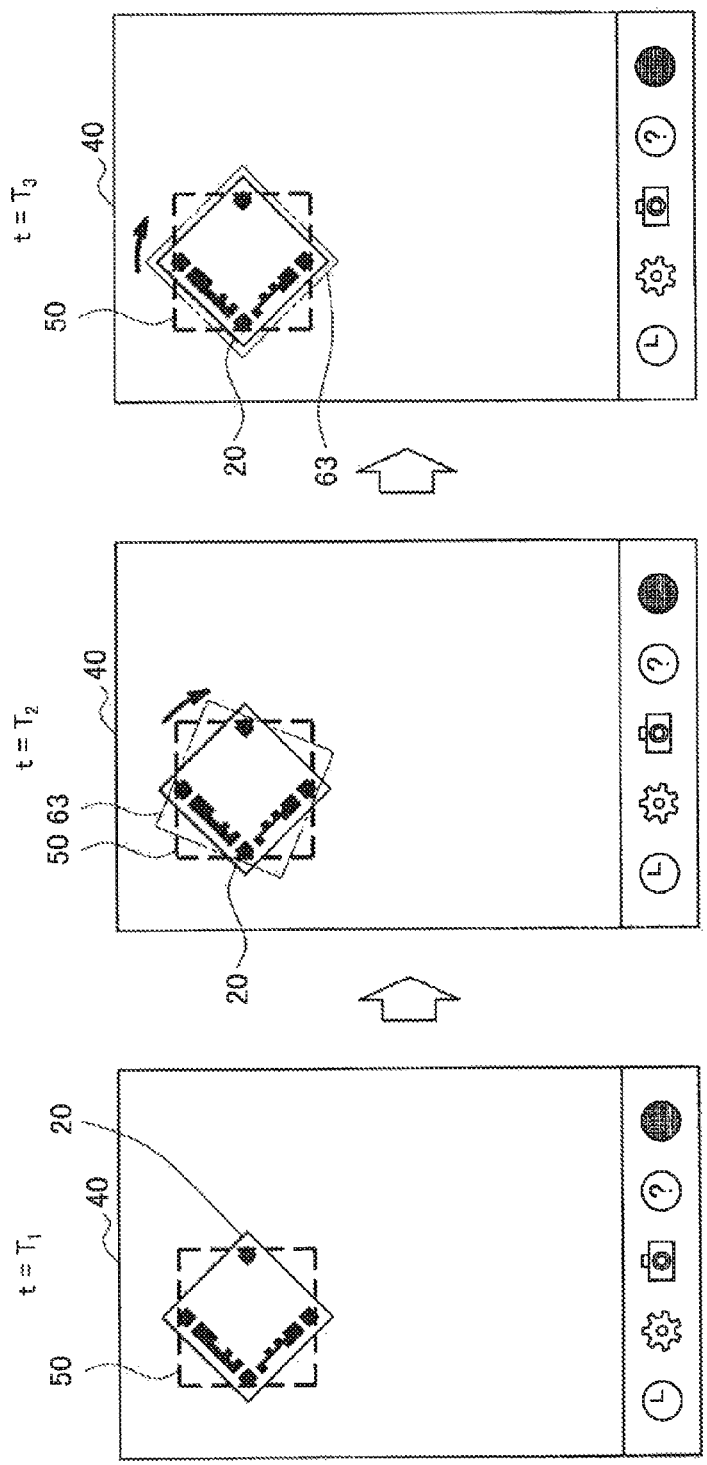
FIG. 9C is an explanatory diagram for explaining a third example of the object with a movement that indicates a relationship between an arrangement pattern of an information code in a captured image and a predetermined arrangement pattern.

FIG. 9C is an explanatory diagram for explaining a third example of the object with the movement that indicates the relationship between the arrangement pattern of the information code in the captured image and the predetermined arrangement pattern (the arrangement pattern relationship). In this example, similarly to the example of FIG. 8C, the information code 20 in the captured image has an angle (a slope) different from an angle (in other words, angle of the object 50) of the predetermined arrangement pattern. For this reason, for example, an object 63 with the rotation in the direction (the clockwise direction) toward the angle of the information code 20 in the captured image from the angle of the object 50 is displayed on the display screen 40 as the object with the movement indicating the arrangement pattern relationship.

Object Having Textual Information Indicating Arrangement Pattern Relationship

As still another example, the object corresponding to the arrangement pattern relationship is an object having textual information that corresponds to the arrangement pattern relationship. A more detailed description thereof will be given below with reference to FIG. 10A, FIG. 10B, and FIG. 10C.

Figure 10A:
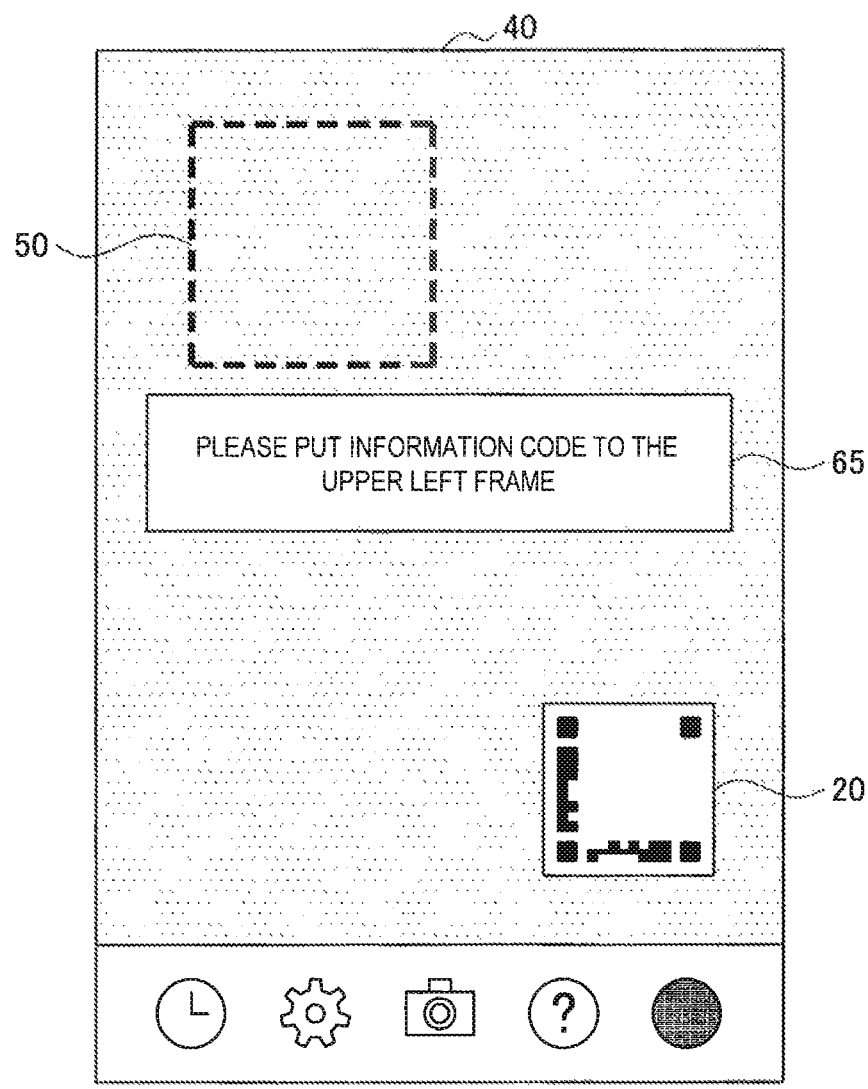
FIG. 10A is an explanatory diagram for explaining a first example of an object having textual information corresponding to a relationship between an arrangement pattern of an information code in a captured image and a predetermined arrangement pattern.

FIG. 10A is an explanatory diagram for explaining a first example of an object having textual information corresponding to a relationship between an arrangement pattern of an information code in a captured image and a predetermined arrangement pattern (i.e., an arrangement pattern relationship). Referring to FIG. 10A, in a display screen 40 of a captured image, an object 50 that indicates a predetermined arrangement pattern is illustrated. In addition, an information code 20 in the captured image is also illustrated. In this example, similarly to the examples of FIG. 8A and FIG. 9A, the information code 20 in the captured image has a position different from a predetermined position (in other words, the position of the object 50) in the predetermined arrangement pattern. For this reason, for example, an object 65 having textual information that presents a prompt for reducing the difference between these positions (i.e., "Please put information code to the upper left frame") is displayed on the display screen 40 as the object having textual information corresponding to the arrangement pattern relationship.

Figure 10B:
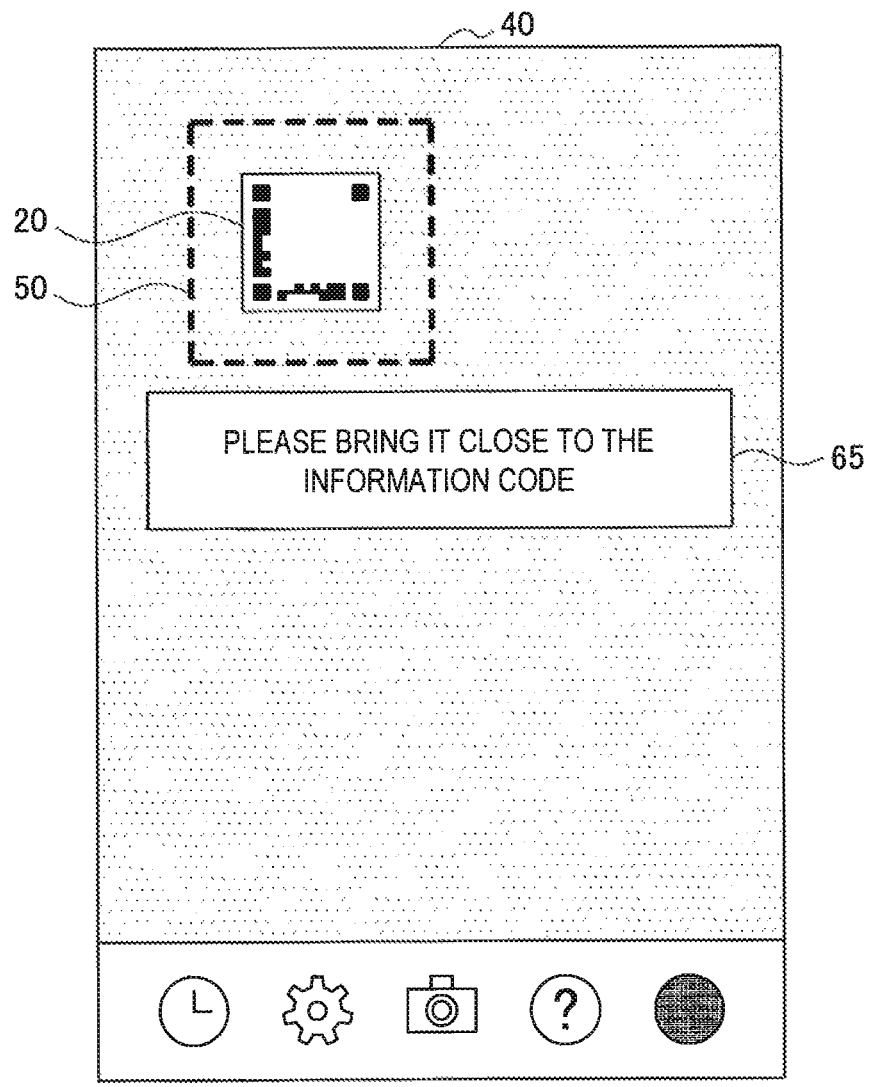
FIG. 10B is an explanatory diagram for explaining a second example of the object having textual information corresponding to a relationship between an arrangement pattern of an information code in a captured image and a predetermined arrangement pattern.

FIG. 10B is an explanatory diagram for explaining a second example of the object having textual information corresponding to the relationship between the arrangement pattern of the information code in the captured image and the predetermined arrangement pattern (i.e., the arrangement pattern relationship). In this example, similarly to the examples of FIG. 8B and FIG. 9B, the information code 20 in the captured image has a size different from a predetermined size (in other words, the size of the object 50) of the predetermined arrangement pattern. For this reason, for example, an object 65 having textual information that presents a prompt for reducing the difference between these sizes (i.e., "Please bring it close to the information code") is displayed on the display screen 40 as the object having textual information corresponding to the arrangement pattern relationship.

Figure 10C:
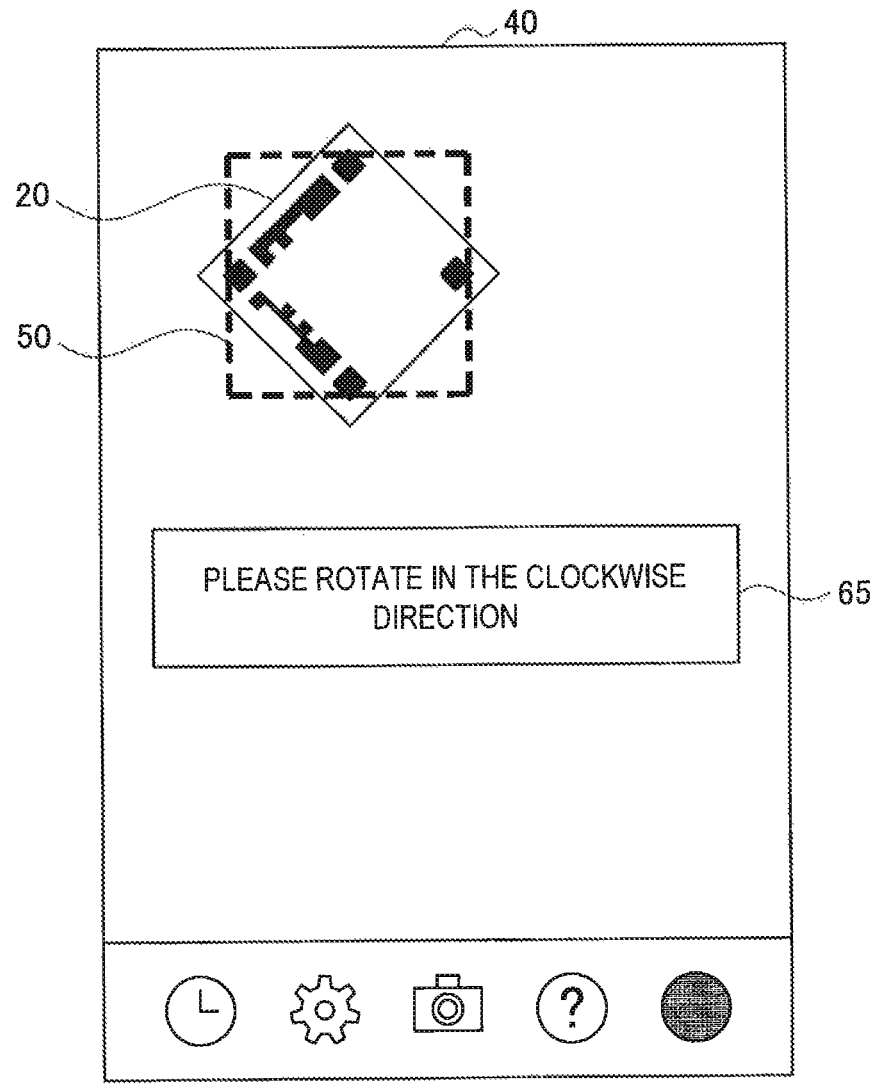
FIG. 10C is an explanatory diagram for explaining a third example of the object having textual information corresponding to a relationship between an arrangement pattern of an information code in a captured image and a predetermined arrangement pattern.

FIG. 10C is an explanatory diagram for explaining a third example of the object having textual information corresponding to the relationship between the arrangement pattern of the information code in the captured image and the predetermined arrangement pattern (i.e., the arrangement pattern relationship). In this example, similarly to the examples of FIG. 8C and FIG. 9C, the information code 20 in the captured image has an angle (a slope) different from an angle (in other words, angle of the object 50) of the predetermined arrangement pattern. For this reason, for example, an object 65 having the textual information that presents a prompt for reducing the difference between these angles (i.e., "Please rotate in the clockwise direction") is displayed on the display screen 40 as the object having textual information corresponding to the arrangement pattern relationship.

(Notification of Arrangement Pattern Relationship by Displaying the Processed Captured Image)

Furthermore, for example, the arrangement pattern relationship notification includes a notification of the arrangement pattern relationship that may be implemented by displaying a captured image processed according to the arrangement pattern relationship on the display screen. A more detailed description thereof will be given below with reference to FIG. 11A and FIG. 11B.

Figure 11A:
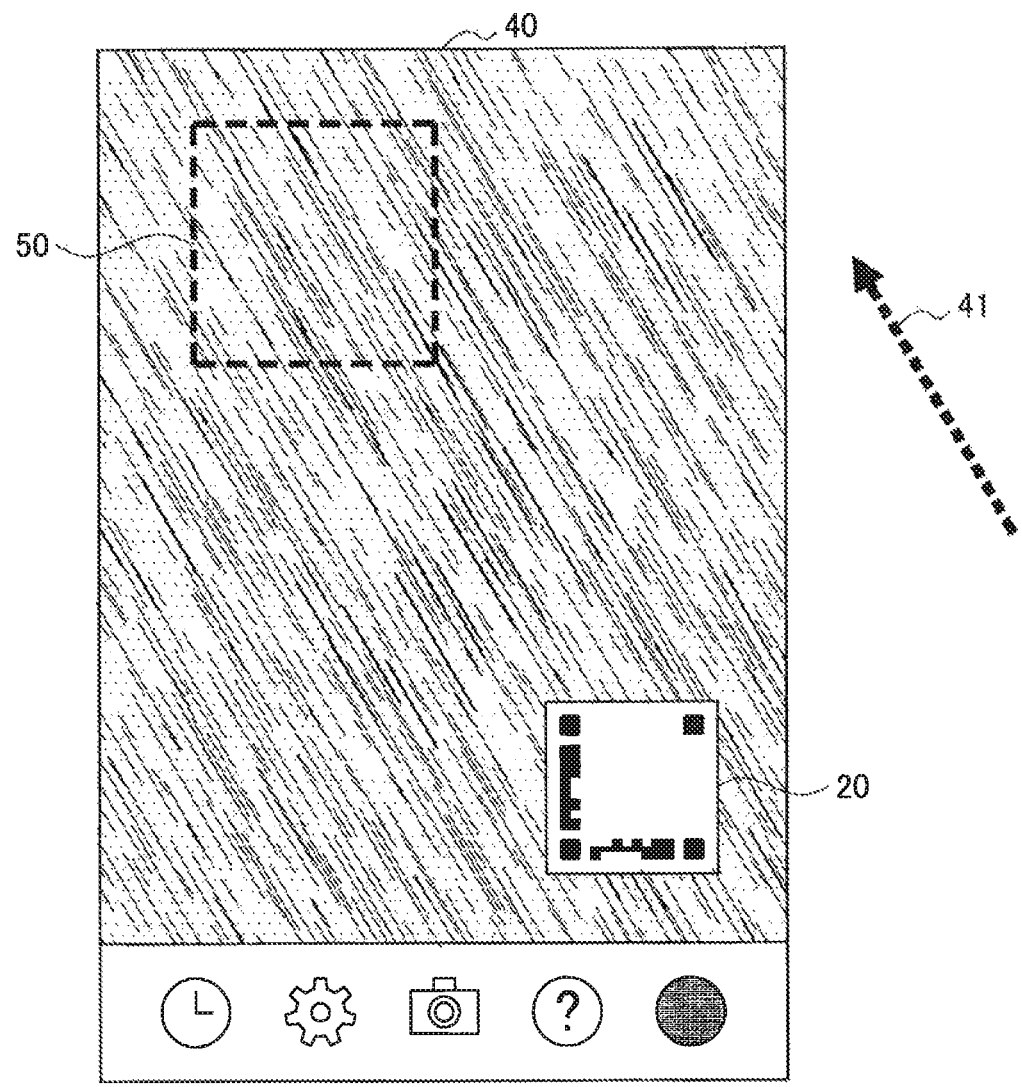
FIG. 11A is an explanatory diagram for explaining a first example of a captured image processed according to a relationship between an arrangement pattern of an information code in a captured image and a predetermined arrangement pattern.

FIG. 11A is an explanatory diagram for explaining a first example of a captured image processed according to a relationship between an arrangement pattern of an information code in the captured image and a predetermined arrangement pattern (i.e., an arrangement pattern relationship). Referring to FIG. 11A, in a display screen 40 of a captured image, an object 50 that indicates a predetermined arrangement pattern is illustrated. In addition, an information code 20 in the captured image is also illustrated. In this example, the information code 20 in the captured image has a position different from a predetermined position (in other words, the position of the object 50) in the predetermined arrangement pattern. For this reason, by processing the captured image, for example, a captured image with an optical flow that indicates a flow in the direction (the direction indicated by an arrow 41) toward the position of the object 50 from the position of the information code 20 in the captured image is displayed in the display screen 40. That is, the optical flow moves in the direction indicated by the arrow 41 as time passes.

Figure 11B:
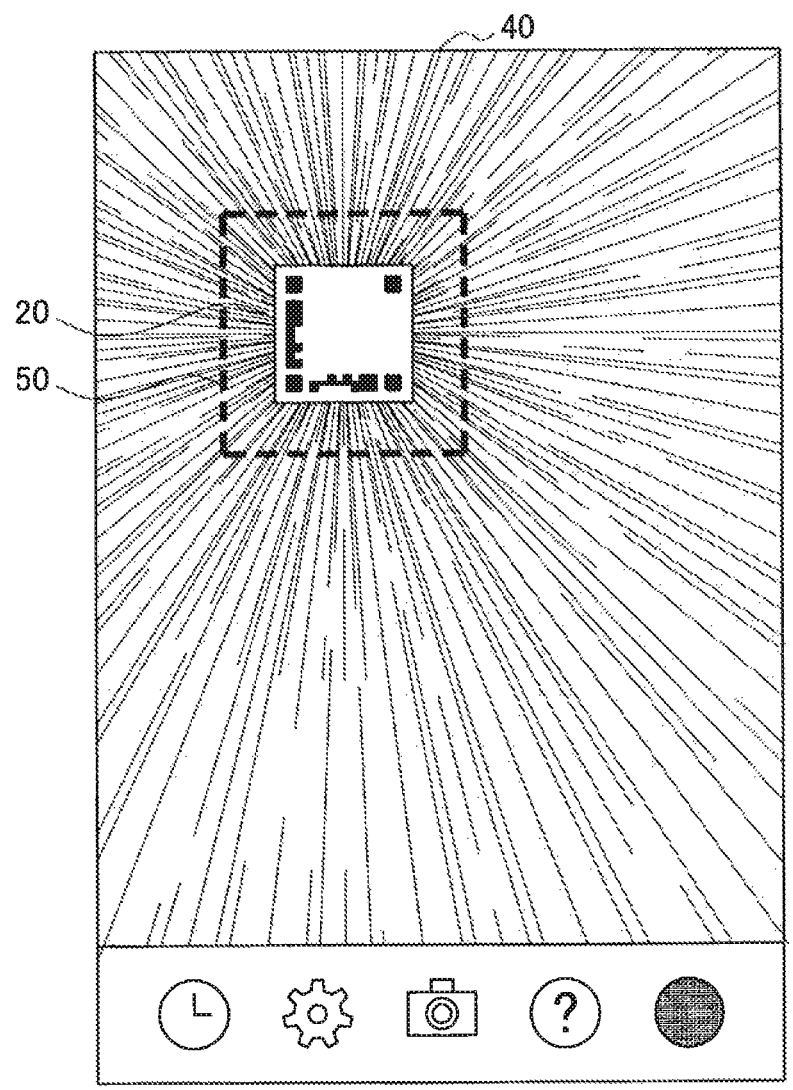
FIG. 11B is an explanatory diagram for explaining a second example of the captured image processed according to a relationship between an arrangement pattern of an information code in a captured image and a predetermined arrangement pattern.

FIG. 11B is an explanatory diagram for explaining a second example of the captured image processed according to the relationship between the arrangement pattern of the information code in the captured image and the predetermined arrangement pattern (i.e., the arrangement pattern relationship). Referring to FIG. 11B, in the display screen 40 of the captured image, an object 50 that indicates a predetermined arrangement pattern is illustrated. In addition, an information code 20 in the captured image is also illustrated. In this example, the information code 20 in the captured image has a size different from a predetermined size (in other words, the size of the object 50) of a predetermined arrangement pattern. In this reason, by processing the captured image, for example, a captured image with an optical flow that indicates a flow in the direction toward the external from the center of the information code 20 in the captured image is displayed in the display screen 40. That is, the optical flow moves in the direction toward the external from the center of the information code 20 as time passes.

(Notification of Arrangement Pattern Relationship by Manifestation of Closer Arrangement Pattern)

Moreover, for example, a plurality of predetermined arrangement patterns in which a display control associated with the information code is performed can be set. In this case, the control unit 170 acquires the relationship between the arrangement pattern of the information code in the captured image and each of the plurality of predetermined arrangement patterns. The arrangement pattern relationship notification includes a notification of the arrangement pattern relationship by displaying an arrangement pattern closer than any other patterns to an arrangement pattern of the information code in the captured image from among the plurality of predetermined arrangement patterns on the display screen. The following description is based on the premise of a plurality of predetermined arrangement patterns and the display control associated with the information code with reference to FIG. 12A and FIG. 12B. An exemplary method of indicating a predetermined arrangement pattern that is closer to the arrangement pattern of the information code in the captured image will be described with reference to FIG. 13A and FIG. 13B.

Figure 12A:
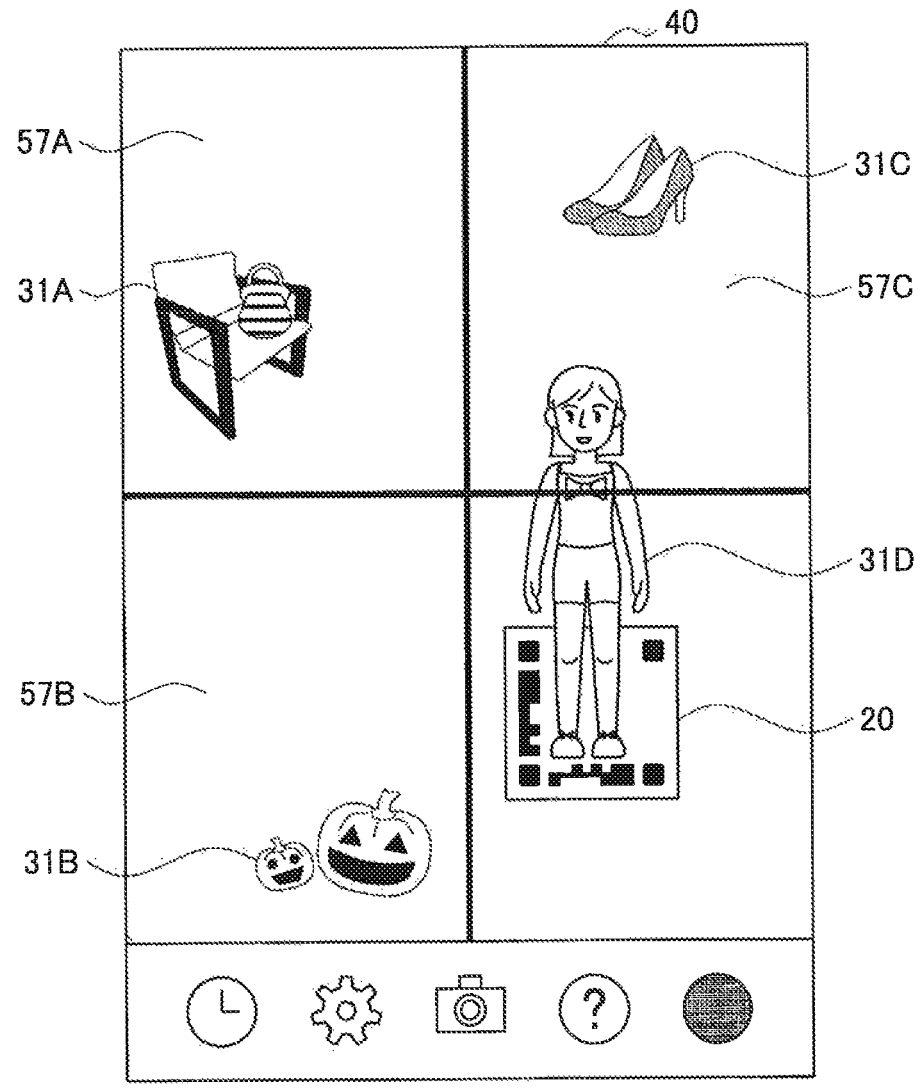
FIG. 12A is an explanatory diagram for explaining an example of a plurality of predetermined arrangement patterns.

FIG. 12A is an explanatory diagram for explaining an example of a plurality of predetermined arrangement patterns. Referring to FIG. 12A, three predetermined arrangement patterns in which the display control associated with the information code 20 is performed are illustrated on the display screen 40 of the captured image. These three arrangement patterns are illustrated, respectively, as a region 57A, a region 57B, and a region 57C. In addition, each region 57 has an individual object 31 therein.

Figure 12B:
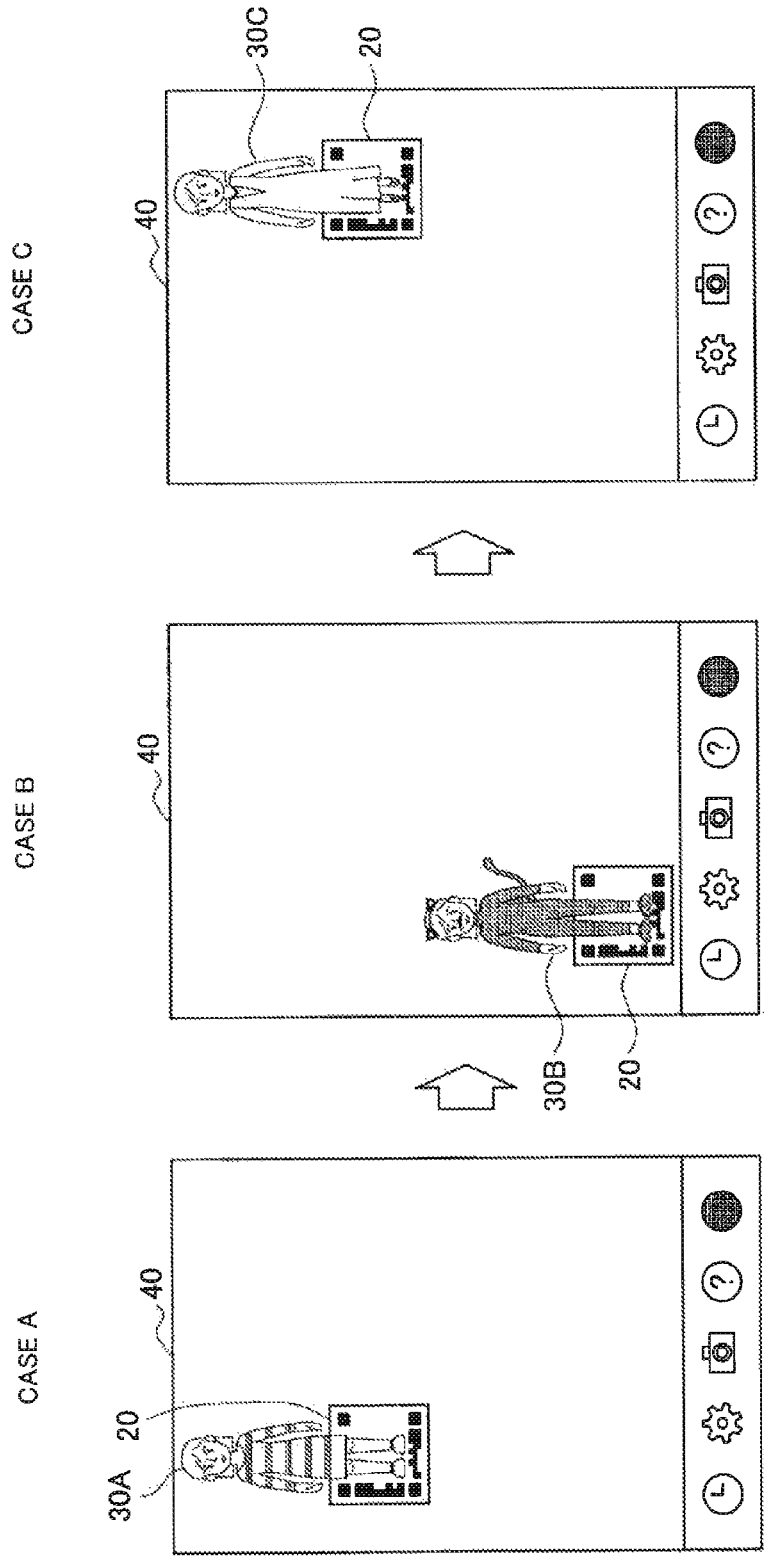
FIG. 12B is an explanatory diagram for explaining an example of controlling a display for each of a plurality of predetermined arrangement patterns.

FIG. 12B is an explanatory diagram for explaining an example of a display control for each of the plurality of predetermined arrangement patterns. Referring to FIG. 12B, there are illustrated three cases, i.e. a case A where the information code 20 is in the region 57A shown in FIG. 12A, a case B where the information code 20 is in the region 57B, and a case C where the information code 20 is in the region 57C. In this way, when an arrangement pattern of the information code 20 in the captured image is any one of the predetermined arrangement patterns, the display control associated with the information code 20 is performed. That is, in this example, content 30 that is associated with the information code 20 is displayed.

Figure 13A:
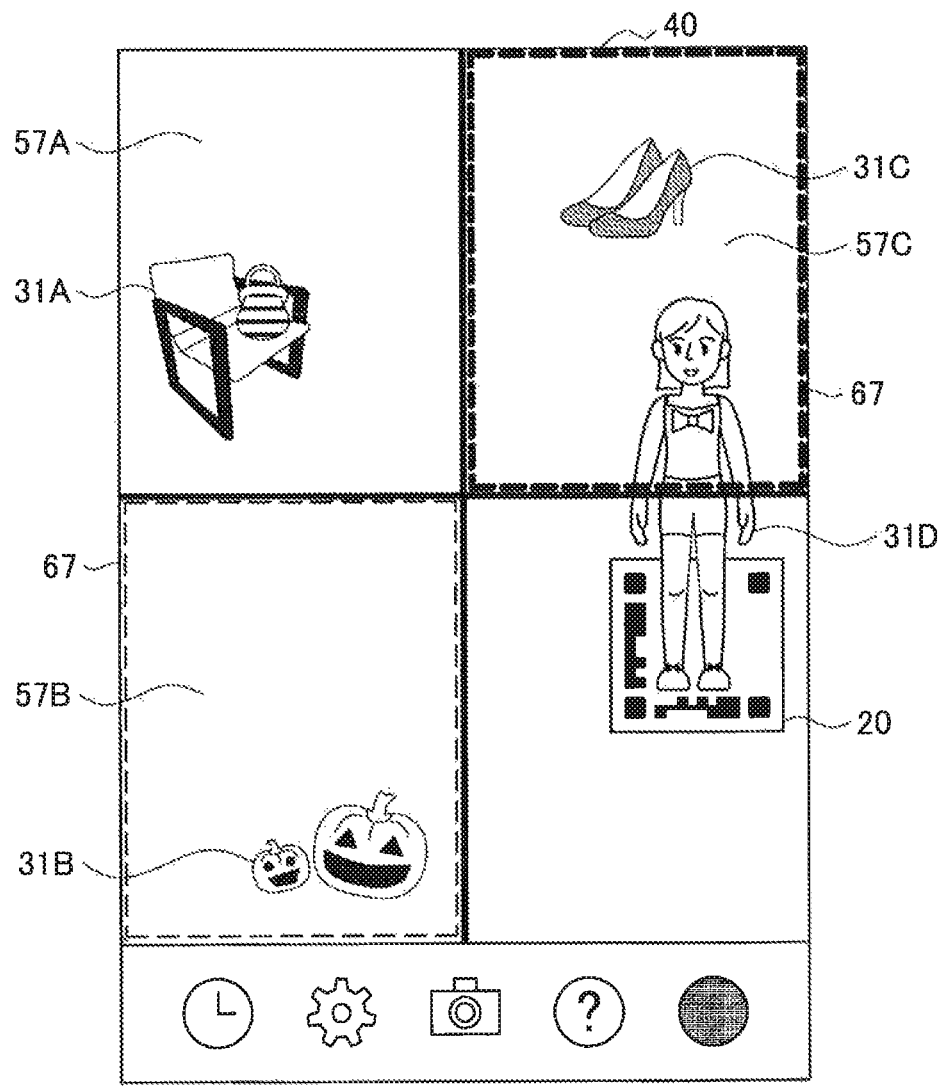
FIG. 13A is an explanatory diagram for explaining a first example of a method of displaying a predetermined arrangement pattern closer than any other patterns to an arrangement pattern of an information code in a captured image.

FIG. 13A is an explanatory diagram for explaining a first example of a method of displaying a predetermined arrangement pattern closer to an arrangement pattern of an information code in a captured image. Referring to FIG. 13A, for example, there are illustrated three predetermined arrangement patterns, i.e., the region 57A, the region 57B, and the region 57C. Among these regions, the region 57C is the closest region to the information code 20. In addition, the region 57B is closer to the information code 20 than the region 57A. In this example, the region 57C is surrounded by a thicker frame, and the region 57B is surrounded by a thinner frame than the region 57C. On the other hand, the region 57A is not surrounded by a frame. In this way, an arrangement pattern (i.e., the region 57) which is closer to the arrangement pattern of the information code 20 in the captured image is displayed on the display screen by surrounding the region 57 disposed closer to the information code from among the regions 57 with a thicker frame.

Figure 13B:
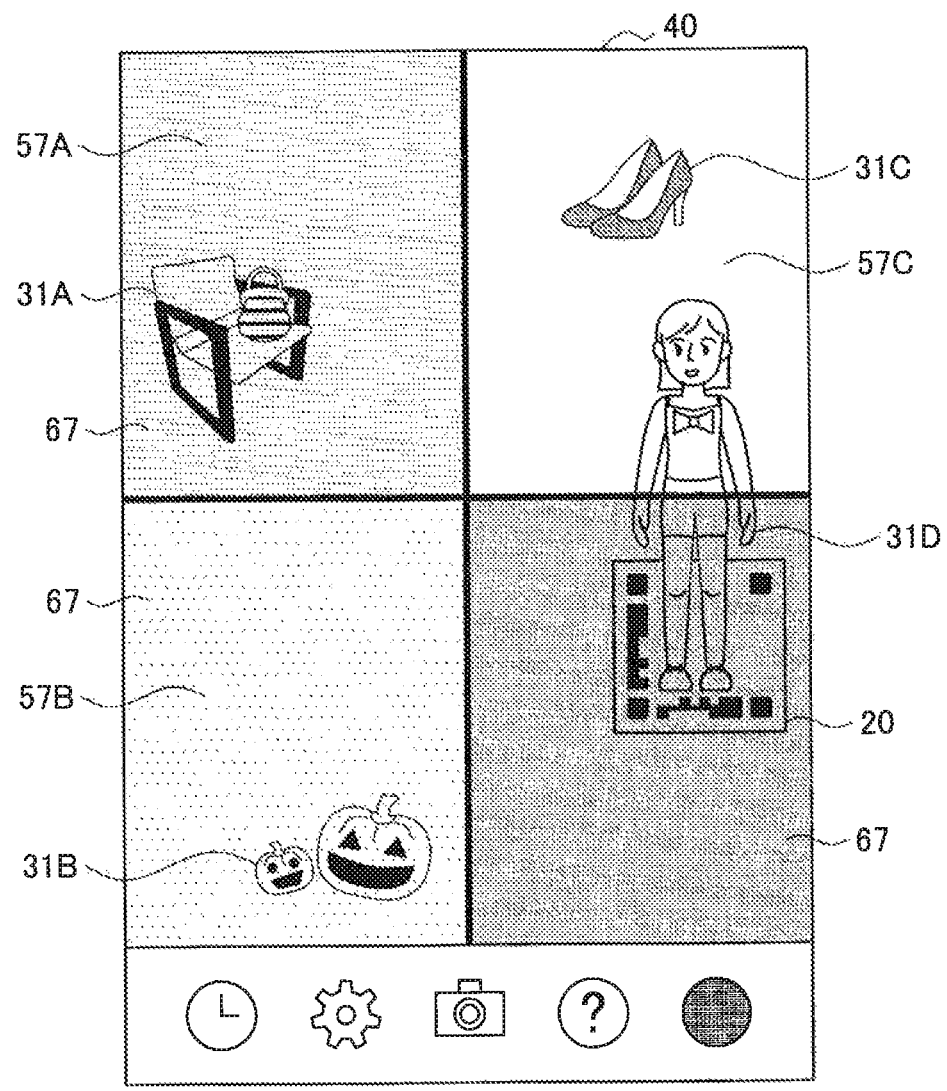
FIG. 13B is an explanatory diagram for explaining a second example of the method of displaying a predetermined arrangement pattern closer than any other patterns to an arrangement pattern of an information code in a captured image.

FIG. 13B is an explanatory diagram for explaining a second example of a method of displaying a predetermined arrangement pattern closer to an arrangement pattern of an information code in a captured image. Also, in this example, similarly to FIG. 13A, the region 57C is the closest region to the information code 20. The region 57B is closer to the information code 20 than the region 57A. In this example, the region 57C is displayed as the brightest region. The region 57B is less bright than the region 57C. The region 57A is much darker than the region 58B. In this way, an arrangement pattern (i.e., the region 57) which is closer to the arrangement pattern of the information code 20 in the captured image is displayed on the display screen by making the region 57 disposed closer to the information code from among the regions 57 to be displayed with much brightness than other regions.

<3.2. Notification of Arrangement Pattern Relationship by Degree of Notification Operation>

Furthermore, the notification of the arrangement pattern relationship can be performed according to the degree of a predetermined operation. In other words, the notification of the arrangement pattern relationship includes a notification of the arrangement pattern relationship according to the degree of a predetermined operation for notifying the arrangement pattern relationship. For example, the control unit 170 of the terminal device 100 controls the notification of the arrangement pattern relationship by determining the degree of a predetermined operation for notifying the arrangement pattern relationship.

Notification According to Degree of Audio Output

As a first example, the predetermined operation described above includes an audio output. In this case, the degree of the predetermined operation is, for example, the size of an audio output. That is, the notification of the arrangement pattern relationship is performed according to the loudness of audio output. A more detailed description thereof will be given below with reference to FIG. 14A.

Figure 14A:
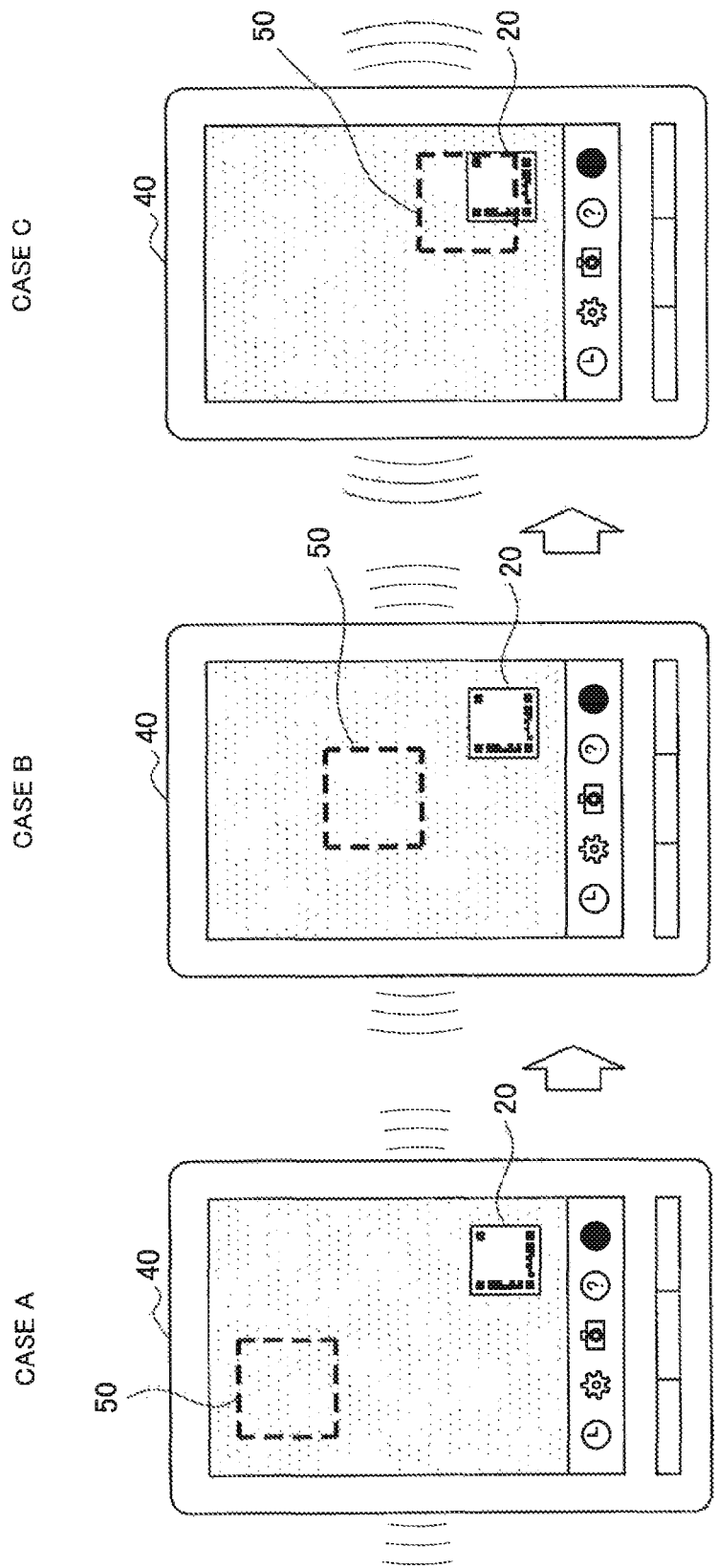
FIG. 14A is an explanatory diagram for explaining an example of a method of notifying an arrangement pattern relationship according to the loudness of an audio output.

FIG. 14A is an explanatory diagram for explaining an example of a method of notifying an arrangement pattern relationship according to the loudness of audio output. Referring to FIG. 14A, there are illustrated three cases, i.e., a case A where an object 50 indicating a predetermined arrangement pattern is placed at a position farthest from the information code 20, a case B where the object 50 is placed at a position closer to the information code 20 than case A, and a case C where the object 50 is placed at a position closest to the information code 20. For example, in case A, the loudness of audio output from the terminal device 100 is smaller than other cases. In addition, in case B, the loudness of audio output is greater than case A. In case C, the loudness of audio output is greater than case B. In this way, as an arrangement pattern of the information code in the captured image becomes close to the predetermined arrangement pattern, the loudness of audio output becomes increased.

In this example, for example, the control unit 170 of the terminal device 100 determines the loudness of audio output according to the acquired arrangement pattern relationship, and causes the audio output unit 150 to output audio corresponding to the loudness.

Note that the degree of predetermined operation may include a height (pitch) of audio output, alternatively, or in addition to, the loudness of audio output.

Notification According to Degree of Vibration

Moreover, as a second example, the above-described predetermined operation includes a vibration of the device. In this case, the degree of predetermined operation is, for example, the magnitude of vibration of the device. That is, notification of the arrangement pattern relationship is performed according to the magnitude of vibration of the terminal device 100. A more detailed description thereof will be given below with reference to FIG. 14B.

Figure 14B:
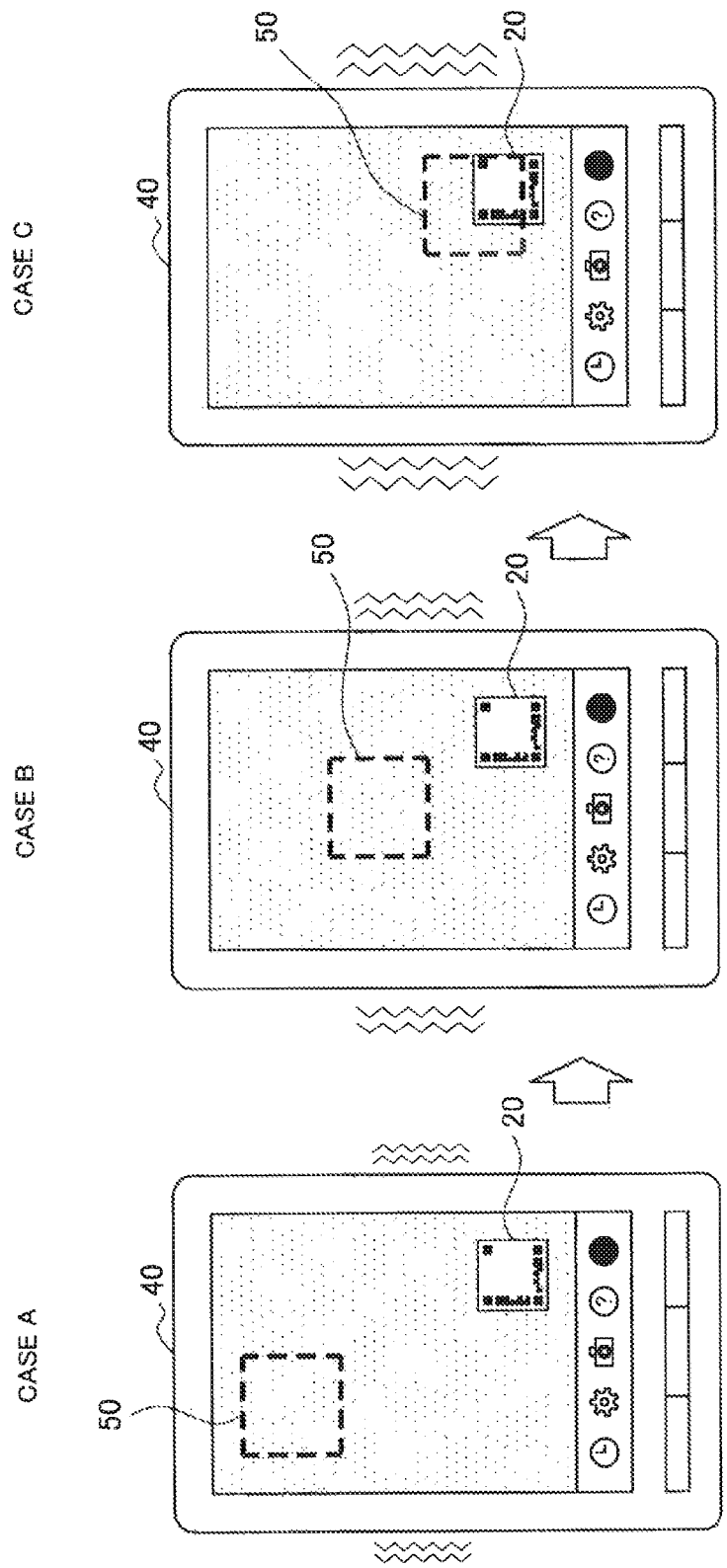
FIG. 14B is an explanatory diagram for explaining an example of a method of notifying an arrangement pattern relationship according to the magnitude of a vibration of a device.

FIG. 14B is an explanatory diagram for explaining an example of a method of notifying an arrangement pattern relationship according to the magnitude of vibration of the device. Referring to FIG. 14B, there are illustrated three cases, i.e., a case A where an object 50 indicating a predetermined arrangement pattern is placed at a position farthest from the information code 20, a case B where the object 50 is placed at a position closer to the information code 20 than case A, and a case C where the object 50 is placed at a position closet to the information code 20. For example, in case A, the magnitude of vibration from the terminal device 100 is smaller than other cases. In addition, in case B, the magnitude of vibration is greater than case A. In case C, the magnitude of vibration is greater than case B. In this way, as an arrangement pattern of the information code in the captured image becomes close to the predetermined arrangement pattern, the magnitude of vibration becomes increased.

In this example, for example, the control unit 170 of the terminal device 100 determines the magnitude of vibration according to the acquired arrangement pattern relationship, and causes the vibration unit 160 to produce a vibration corresponding to the magnitude.

Note that the degree of predetermined operation may include the frequency of vibration, as an alternative to, or in addition to, the magnitude of vibration.

Notification According to Degree of Change in Display

Furthermore, as a third example, the above-described predetermined operation includes a change in display on the display screen of the captured image. In this case, the degree of the predetermined operation is, for example, the frequency of change in display. That is, the arrangement pattern relationship is notified according to the frequency of change in display on the display screen.

As an example, the change in display on the display screen is the change in an object displayed on the display screen. In this case, the degree of predetermined operation is, for example, the frequency of change in the object.

More specifically, for example, the arrangement pattern relationship is notified according to flickering frequency of the object 50 indicating the predetermined arrangement pattern. For example, as an arrangement pattern of the information code in the captured image becomes close to the predetermined arrangement pattern, the flickering frequency of the object 50 becomes increased.

4. FLOW OF PROCESSING

An example of information processing in accordance with the present exemplary embodiment will now be described with reference to FIG. 15A and FIG. 15B.

(Processing to be Performed in Terminal Device 100 Side)

Figure 15A:
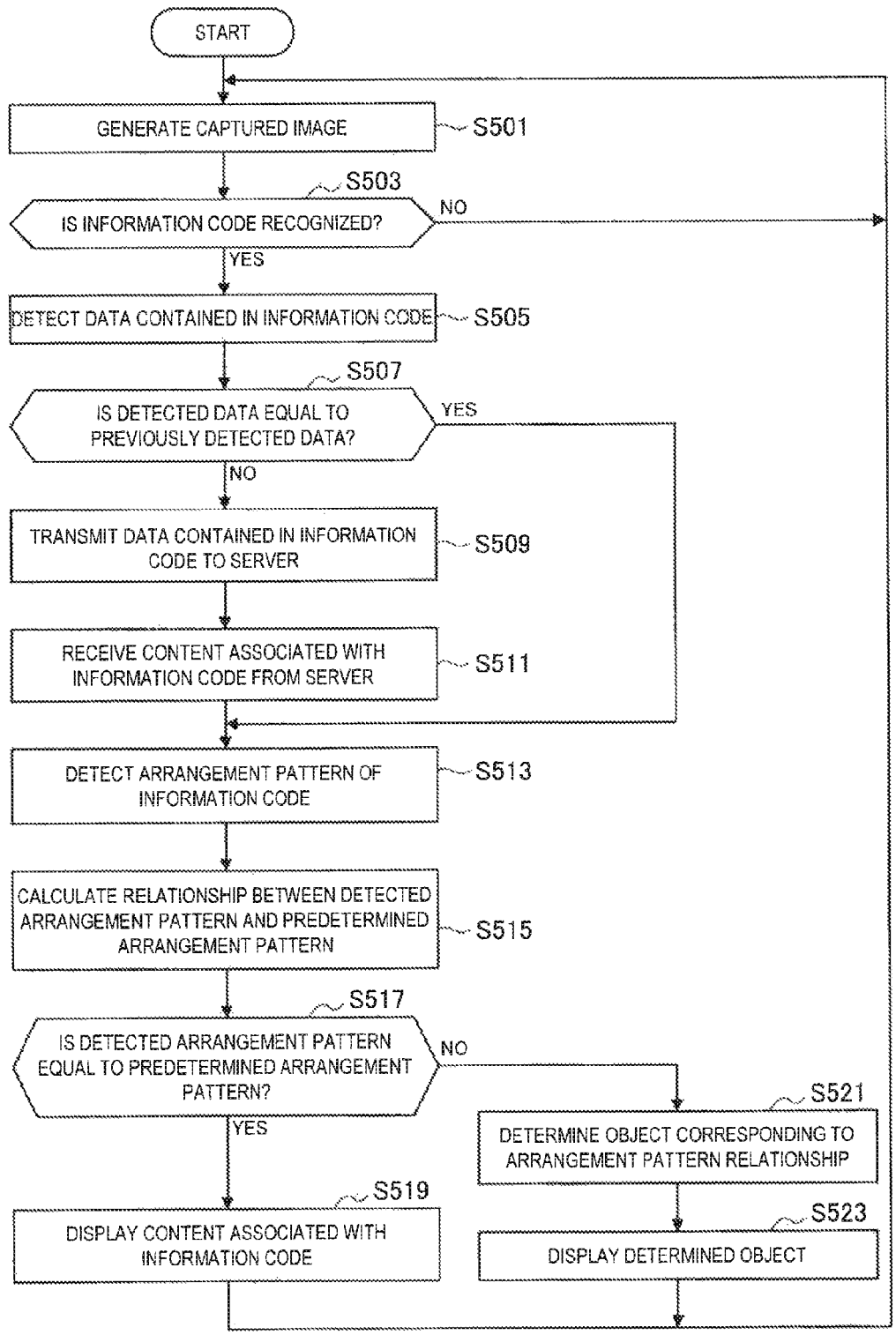
FIG. 15A is a flow chart illustrating an example of a schematic flow of information processing to be performed by a terminal device in accordance with an embodiment.

FIG. 15A is a flow chart illustrating an example of a schematic flow of information processing to be performed by the terminal device 100 in accordance with the present exemplary embodiment.

In step S501, the imaging unit 110 captures a subject to generate a captured image. In step S503, the control unit 170 attempts to recognize an information code from the captured image and determines whether the information code is recognized. If it is determined that the information code is recognized, then the process proceeds to step S505. If it is not determined that the information code is recognized, then the process returns to step S501.

In step S505, the control unit 170 detects data contained in the information code. In step S507, the control unit 170 determines whether the detected data is equal to data previously detected. If it is determined that the detected data is data previously detected, then the process proceeds to step S513. If it is not determined that the detected data is equal to data previously detected, then the process proceeds to step S509.

In step S509, the control unit 170 causes the communication unit 120 to transmit the detected data to the server 200. In step S511, the communication unit 120 receives contents associated with the information code (or data contained in the information code) from the server 200.

In step S513, the control unit 170 detects an arrangement pattern of the information code in the captured image. In step S515, the control unit 170 calculates a relationship between the detected arrangement pattern and the predetermined arrangement pattern. In step S517, the control unit 170 determines whether the detected arrangement pattern is the predetermined arrangement pattern. If it is determined that the detected arrangement pattern is the predetermined arrangement pattern, then the process proceeds to step S519. If it is not determined that the detected arrangement pattern is the predetermined arrangement pattern, then the process proceeds to step S521.

In step S519, the control unit 170 causes the display unit 140 to display contents associated with the information code. The process then returns to step S501.

In step S521, the control unit 170 determines an object that corresponds to the relationship between the detected arrangement pattern and the predetermined arrangement pattern (i.e., the arrangement pattern relationship). In step S523, the control unit 170 causes the display unit 140 to display the determined object, and then the process returns to step S501.

(Processing to be Performed in Server 200 Side)

Figure 15B:
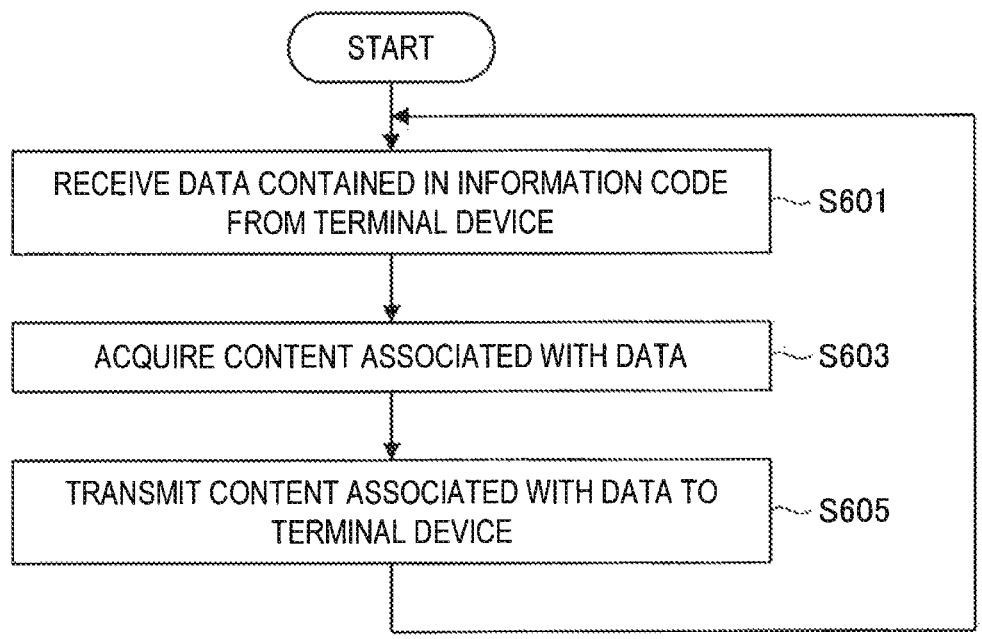
FIG. 15B is a schematic flow chart illustrating an example of a schematic flow of information processing to be performed by a server in accordance with an embodiment.

FIG. 15B is a flowchart illustrating an example of a schematic flow of information processing to be performed by the server 200 in accordance with the present exemplary embodiment.

In step S601, the communication unit 210 receives data contained in the information code from the terminal device 100.

In step S603, the control unit 230 acquires contents associated with the data from the storage unit 220.

In step S605, the control unit 230 causes the communication unit 210 to transmit the contents to the terminal device 100. The process then returns to step S601.

5. MODIFIED EXAMPLE

Subsequently, a modified example of the present exemplary embodiment will be described with reference to FIG. 16 to FIG. 19B.

<5.1. Overview of Modified Example>

In the modified example of the present exemplary embodiment, a predetermined arrangement pattern, which is used in performing the display control associated with the information code, is determined independently of the information code. That is, if the information code contained in the captured image is changed, the predetermined arrangement pattern may be changed accordingly. A case where a predetermined arrangement pattern is changed independently of the information code will be described with reference to FIG. 16, and a case where a predetermined arrangement pattern is changed according to the information code as a modified example of the present exemplary embodiment will be described with reference to FIG. 17.

Figure 16:
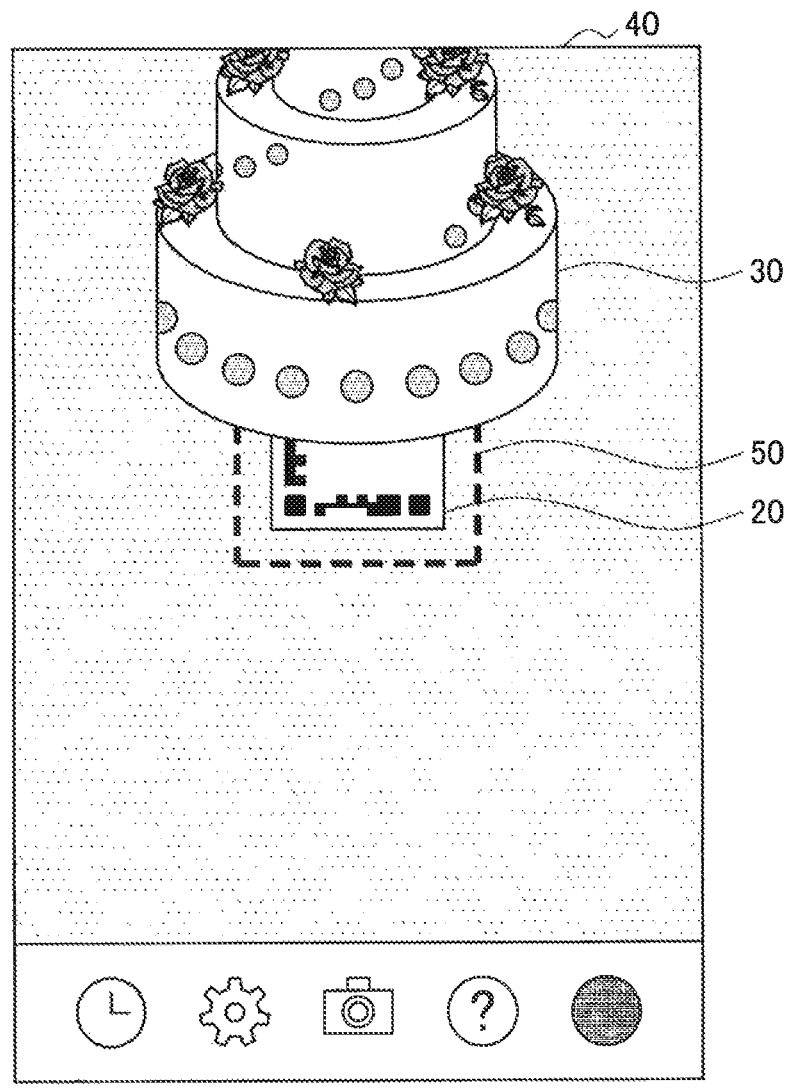
FIG. 16 is an explanatory diagram for explaining an example of a case where a predetermined arrangement pattern is not changed depending on an information code.

FIG. 16 is an explanatory diagram for explaining an example of a case where a predetermined arrangement pattern is not changed depending on an information code. Referring to FIG. 16, a display screen 40 of a captured image is illustrated. The captured image contains an information code 20. An object 50 that indicates a predetermined arrangement pattern is displayed on the display screen 40. In this example, the predetermined arrangement pattern has a predetermined position that is the center of the screen. The arrangement pattern of the information code 20 is the predetermined arrangement pattern (i.e., the arrangement pattern indicated by the object 50), and thus content 30 associated with the information code is shown. As a result, the content 30 gets out of the display screen 40. If a predetermined arrangement pattern is not suitable for the content 30, there may be a possibility that the content 30 is not fitted into the display screen 40.

Figure 17:
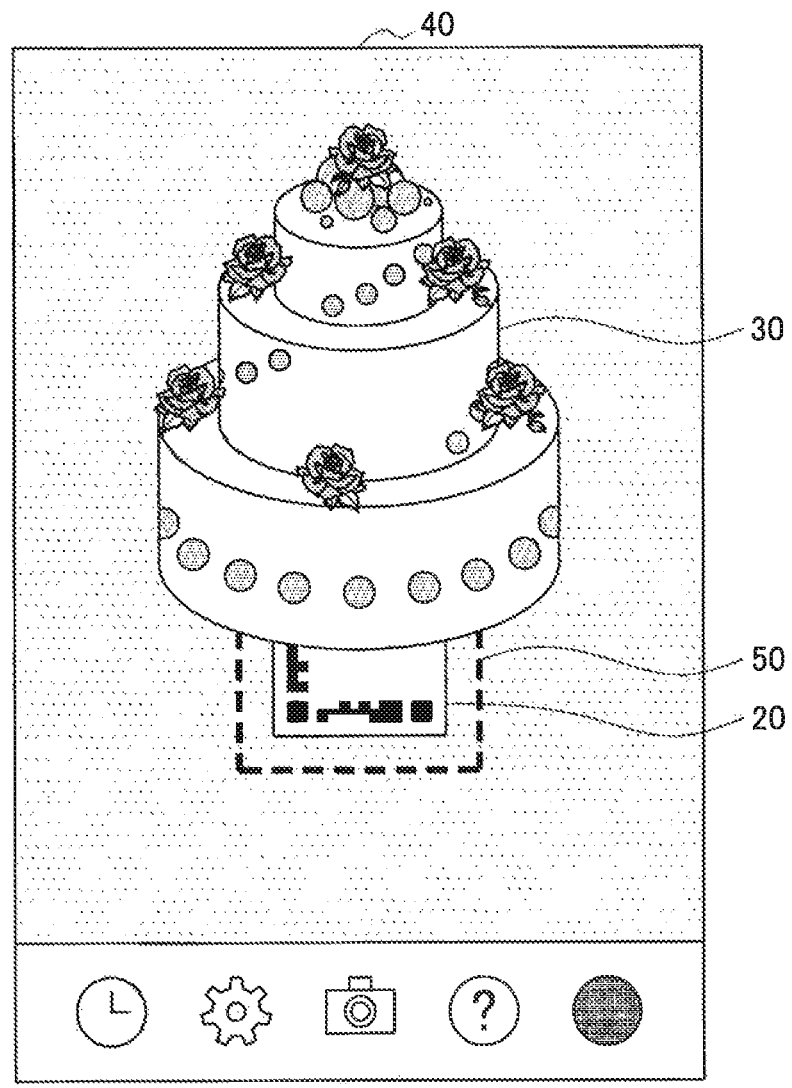
FIG. 17 is an explanatory diagram for explaining an example of a case where a predetermined arrangement pattern is changed depending on an information code in accordance with a modified example of an embodiment.

FIG. 17 is an explanatory diagram for explaining an example of a case where a predetermined arrangement pattern is changed depending on an information code in accordance with a modified example of the present embodiment. In this example, a predetermined arrangement pattern is determined independently of the information code. As an example, the predetermined arrangement pattern has a predetermined position, and the predetermined position is the lower side of the screen. The arrangement pattern of the information code 20 is the predetermined arrangement pattern (i.e., the arrangement pattern indicated by the object 50), and thus content 30 associated with the information code is shown. As a result, the content 30 is displayed without getting out of the display screen 40. If a predetermined arrangement pattern is determined independently of the information code (i.e., in this example, the arrangement pattern suitable for the content 30), the content 30 is fitted into the display screen 40.

As described above, in the modified example of the present embodiment, a predetermined arrangement pattern is determined to be suitable for the information code, thus it is possible to implement a desired display dependent on the information code on a display screen.

<5.2. Configuration of Each Device>
(Terminal Device 100: Control Unit 170)
Manifestation of Predetermined Arrangement Pattern The control unit 170 acquires data contained in the information code and determines an arrangement pattern corresponding to the data as the predetermined arrangement pattern. The control unit 170 then performs a display control for allowing the determined predetermined arrangement pattern to be displayed on a display screen.

More specifically, for example, as described above, the control unit 170 recognizes an information code in a captured image and detects data contained in the information code. The control unit 170 then causes the communication unit 120 to transmit the detected data to the server 200. In the modified example of the present embodiment, the communication unit 120 then receives an arrangement pattern associated with the information code (or data contained in the information code) and contents associated with the information code (or data contained in the information code) from the server 200. The control unit 170 determines the received arrangement pattern as the predetermined arrangement pattern.

(Server 200: Storage Unit 220)

The storage unit 220 stores a combination of data contained in the information code and the arrangement pattern associated with the information code. In this way, the data is associated with the arrangement pattern, and, as a result, the information code will be associated with the arrangement pattern.

(Server 200: Control Unit 230)
Instruction of Predetermined Arrangement Pattern

For example, the control unit 230 causes the terminal device 100 to determine the arrangement pattern associated with the information code as the predetermined arrangement pattern.

More specifically, for example, as described above, the communication unit 210 receives data contained in the information code from the terminal device 100. In the modified example of the present embodiment, the control unit 230 then acquires an arrangement pattern associated with the data, in addition to contents associated with the data, from the storage unit 220. The control unit 230 then causes the communication unit 210 to transmit the contents and arrangement pattern to the terminal device 100. Accordingly, the terminal device 100 determines the received arrangement pattern as the predetermined arrangement pattern. Thus, the server 200 causes the terminal device 100 to determine the arrangement pattern associated with the information code as the predetermined arrangement pattern.

<5.3. Specific Example of Predetermined Arrangement Pattern Depending on Information Code>

As described above, in the present example, a predetermined arrangement pattern that is used in performing the display control associated with an information code is determined independently of the information code. A specific example of such an arrangement pattern is described below with reference to FIG. 18A to FIG. 18D.

Figure 18A:
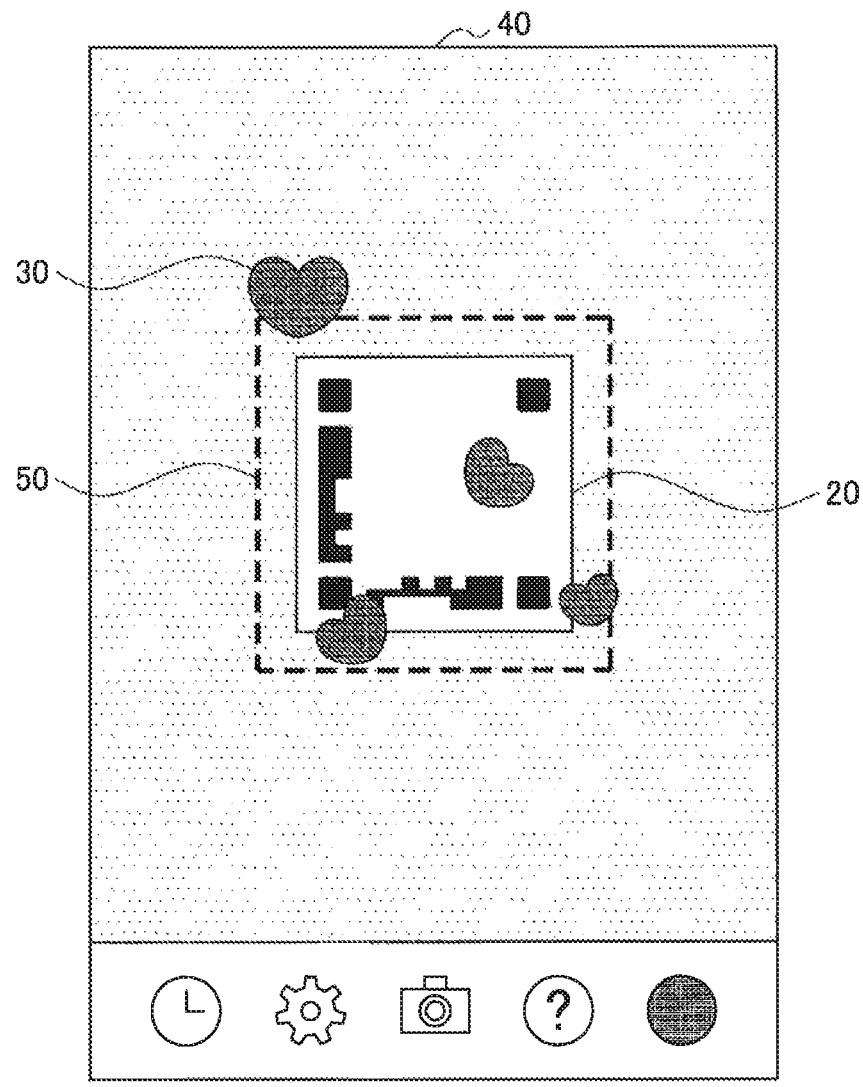
FIG. 18A is an explanatory diagram for explaining a first example of an arrangement pattern which is determined independently of an information code.

FIG. 18A is an explanatory diagram for explaining a first example of an arrangement pattern which is determined independently of an information code. Referring to FIG. 18A, an object 50 that indicates a predetermined arrangement pattern is shown on a display screen 40 of a captured image. In addition, an information code 20 in the captured image is also shown. Content 30 (flying hearts) that is associated with the information code is also displayed. In this example, the content 30 is displayed in a wide range of areas, and thus, for example, the object 50 is placed at the center of the display screen 40. That is, a predetermined position in the predetermined arrangement pattern is the center of the display screen 40. Thus, an arrangement pattern suitable for displaying the content 30 is used as the arrangement pattern for displaying the content 30.

Figure 18B:
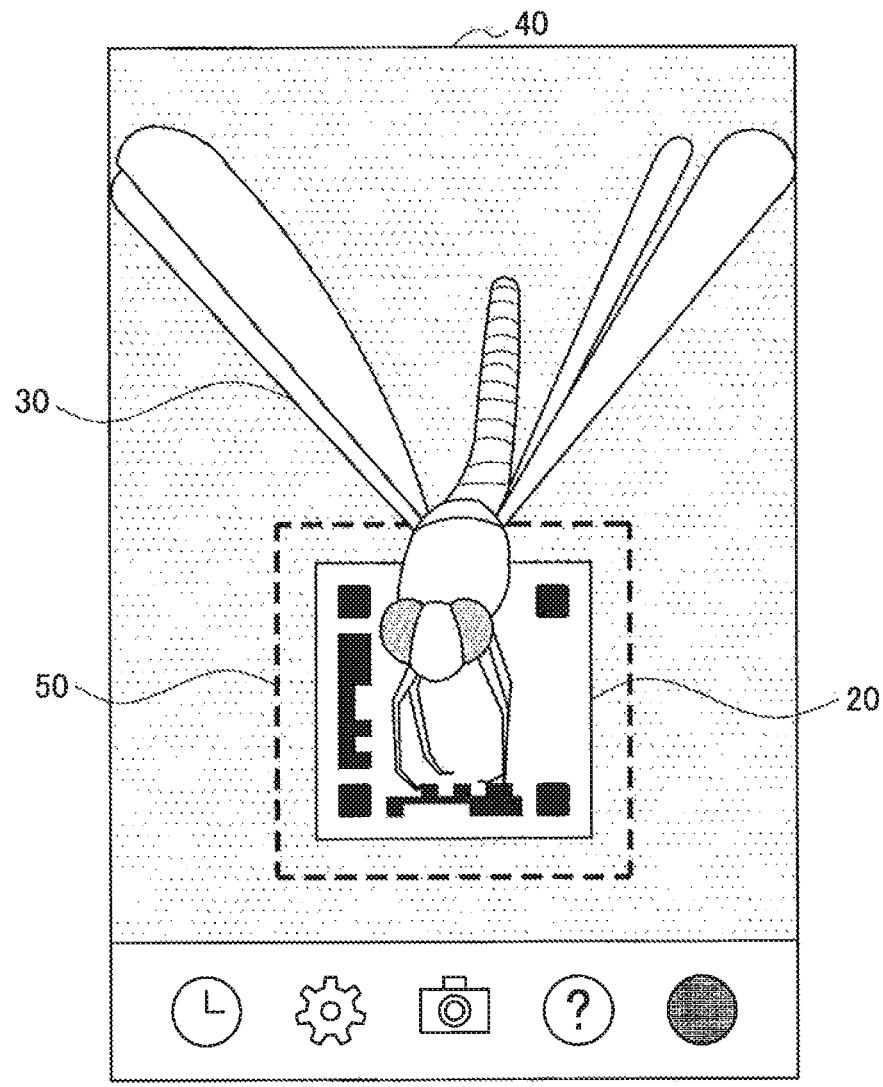
FIG. 18B is an explanatory diagram for explaining a second example of the arrangement pattern which is determined independently of an information code.

FIG. 18B is an explanatory diagram for explaining a second example of the arrangement pattern which is determined independently of an information code. Referring to FIG. 18B, an object 50 that indicates a predetermined arrangement pattern is shown on a display screen 40 of a captured image. In addition, an information code 20 in the captured image is also displayed. A content 30 (a dragonfly) that is associated with the information code is also displayed. In this example, the content 30 is displayed as extending upward from the center of the display screen 40, and thus, for example, the object 50 is placed at the lower side of the display screen 40. That is, a predetermined position in the predetermined arrangement pattern is the lower side of the display screen 40. Thus, an arrangement pattern suitable for displaying the content 30 is used as the arrangement pattern for displaying the content 30.

Figure 18C:
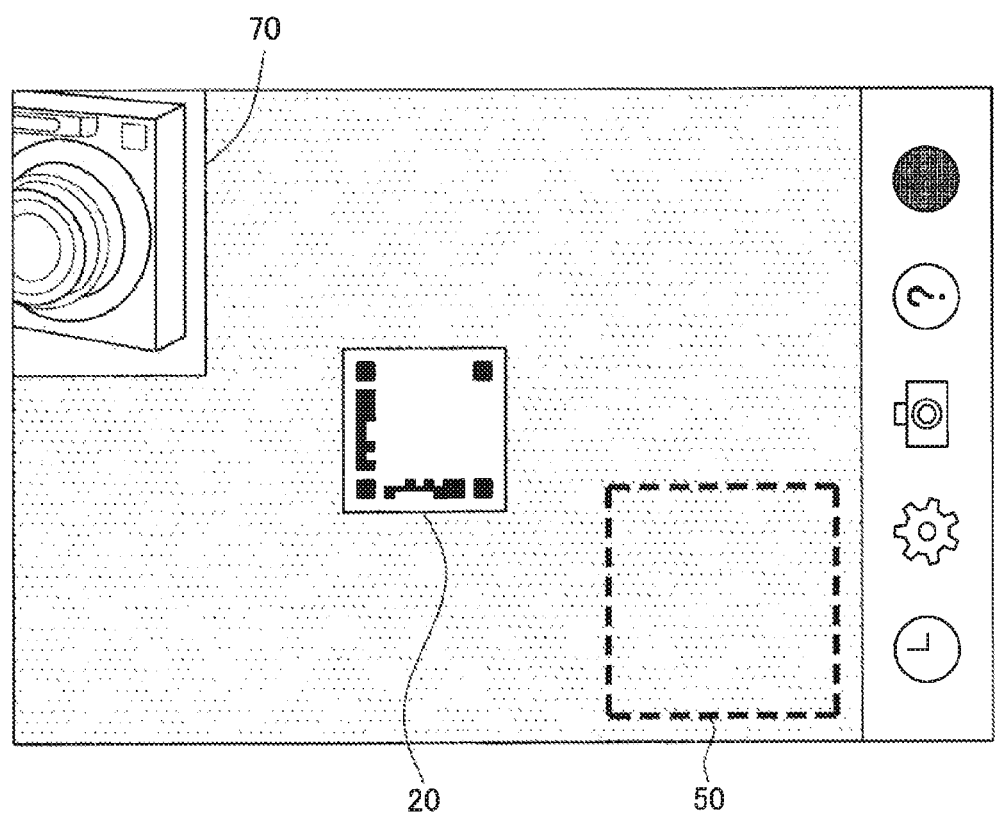
FIG. 18C is a first explanatory diagram for explaining a third example of the arrangement pattern which is determined independently of an information code.

FIG. 18C is a first explanatory diagram for explaining a third example of the arrangement pattern which is determined independently of an information code. Referring to FIG. 18C, an object 50 that indicates a predetermined arrangement pattern is shown on a display screen 40 of a captured image. In addition, an information code 20 in the captured image is also displayed. The information code 20 is printed on a catalog. The information code 20 is placed at the lower right side of a photograph 70 that shows a product in the catalog.

Figure 18D:
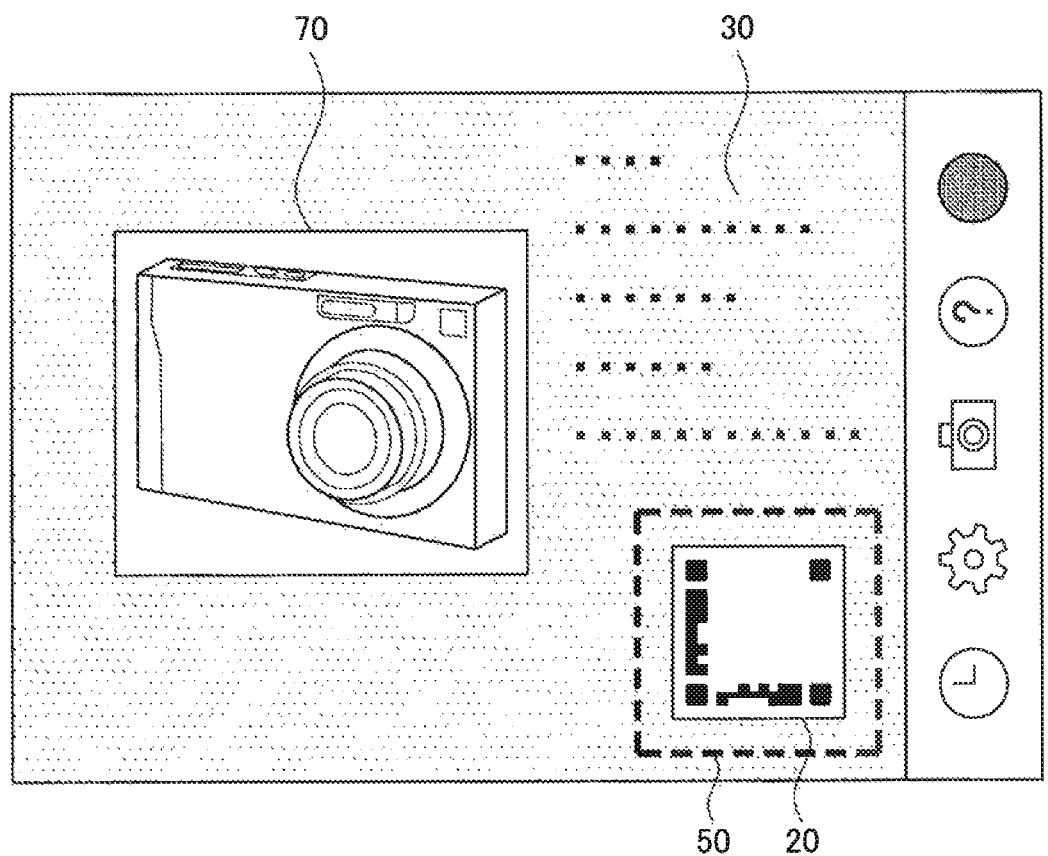
FIG. 18D is a second explanatory diagram for explaining the third example of the arrangement pattern that is determined independently of an information code.

FIG. 18D is a second explanatory diagram for explaining the third example of the arrangement pattern that is determined independently of an information code. If the arrangement pattern of the information code 20 is a predetermined arrangement pattern in the example of FIG. 18C, the content 30 (textual information concerning the description for a product) is displayed as illustrated in FIG. 18D. In this example, the object 50 is placed at the lower right side of the display screen 40 so that content 30 is displayed in the right side of the photograph 70 in a state where the photograph 70 that shows a product in the catalog is reflected on the captured image. That is, a predetermined position in the predetermined arrangement pattern is the lower right side of the display screen 40. Thus, an arrangement pattern suitable for displaying both the photograph 70 that shows a product in a catalog and the content 30 is used as the arrangement pattern for displaying the content 30.

<5.4. Flow of Processing>

An example of information processing in accordance with the modified example of the present embodiment is now described with reference to FIG. 19A and FIG. 19B.

(Processing to be Performed in the Terminal Device 100 Side)

Figure 19A:
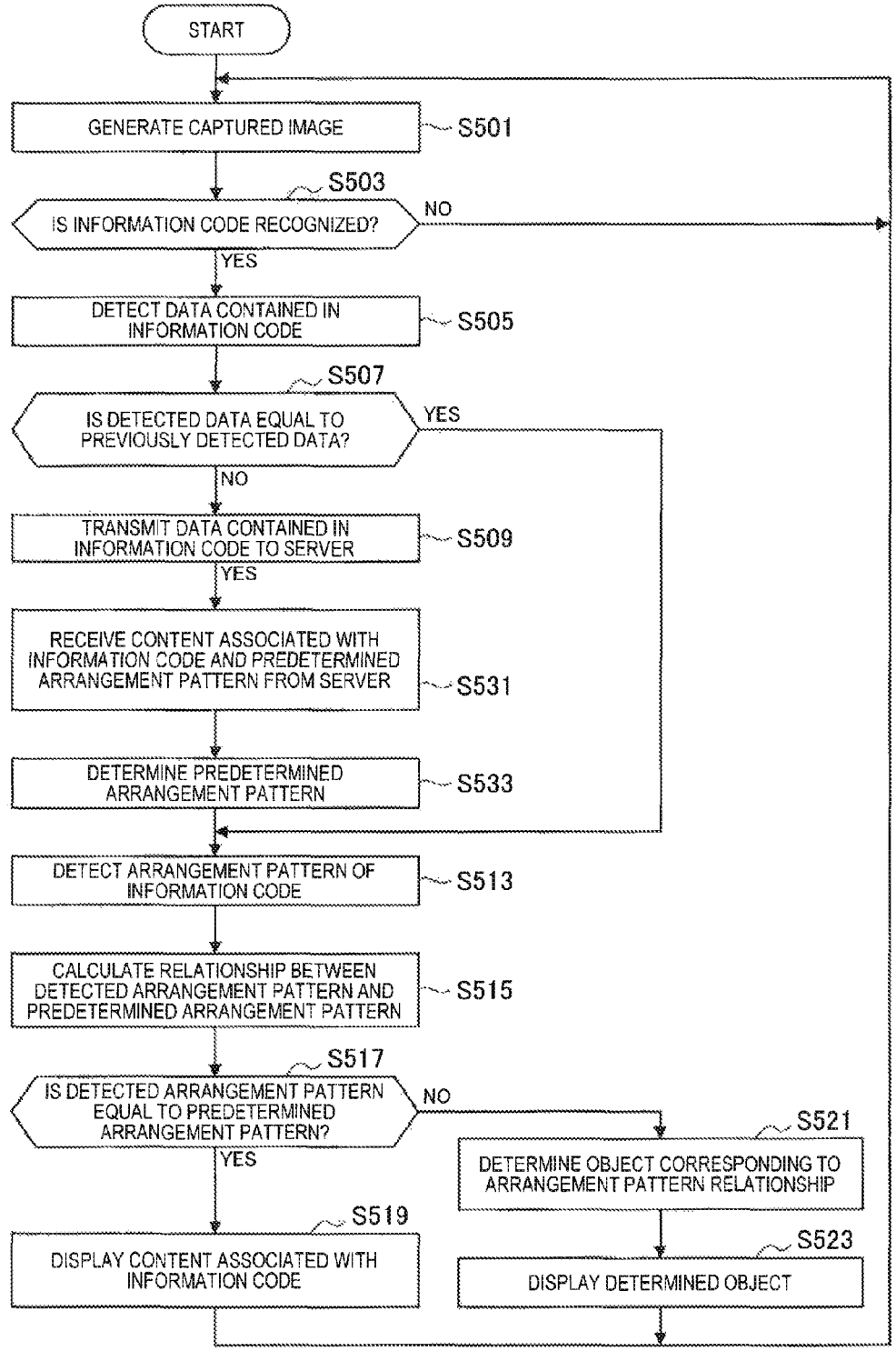
FIG. 19A is a flow chart illustrating an example of a schematic flow of information processing to be performed by a terminal device in accordance with a modified example of an embodiment.

FIG. 19A is a flow chart illustrating an example of a schematic flow of information processing to be performed by the terminal device 100 in accordance with a modified example of the present embodiment. In this regard, the following description is focused on the difference between the exemplary information processing in accordance with the present embodiment described above with reference to FIG. 15A and an information processing in accordance with the modified example of the present embodiment, i.e., steps S531 and S533.

In step S531, the communication unit 120 receives contents associated with the information code (or data contained in the information code) and an arrangement pattern associated with the information code (or the data) from the server 200.

In step S533, the control unit 170 determines the arrangement pattern associated with the information code as the predetermined arrangement pattern. As a result, an object that indicates the determined arrangement pattern is displayed on the display screen.

(Processing to be Performed in the Server 200 Side)

Figure 19B:
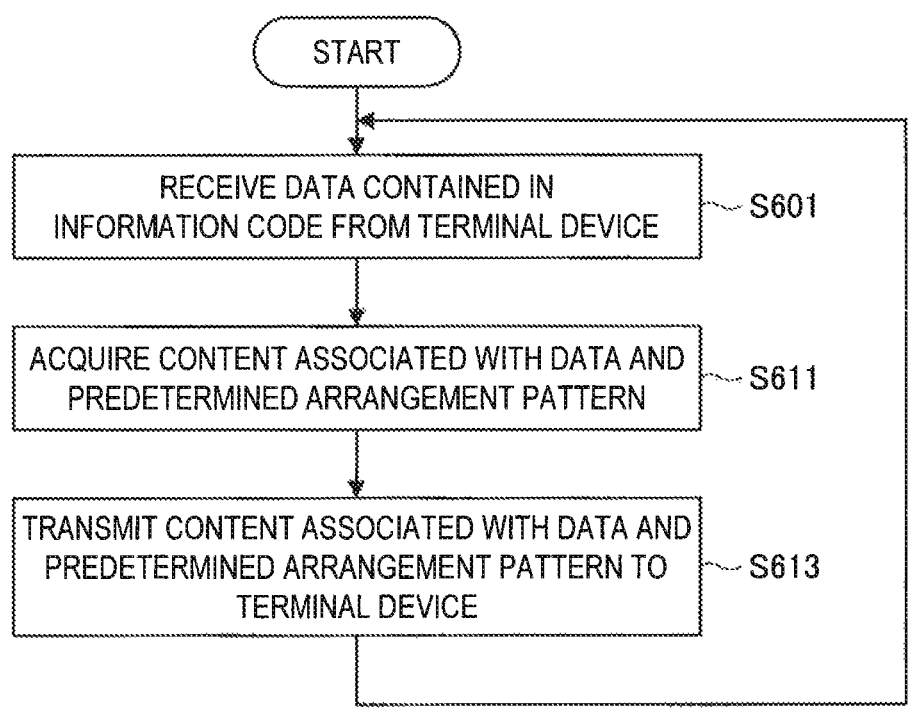
FIG. 19B is a flow chart illustrating an example of a schematic flow of information processing to be performed by a server in accordance with a modified example of an embodiment.

FIG. 19B is a flow chart illustrating an example of a schematic flow of information processing to be performed by the server 200 in accordance with a modified example of the present embodiment. With regard to this exemplary flow, the following description is focused on the difference between the exemplary information processing in accordance with the present embodiment described above with reference to FIG. 15A and an information processing according to the modified example of the present embodiment, i.e., steps S611 and S613.

In step S611, the control unit 230 acquires contents associated with data contained in the information code and the arrangement pattern from the storage unit 220.

In step S613, the control unit 230 causes the communication unit 210 to transmit the contents and the arrangement pattern to the terminal device 100. The process then returns to step S601.

6. CONCLUSION

Each of the devices and its information processing in accordance with the embodiments of the present disclosure has been described with reference to FIG. 1 to FIG. 19B. According to the embodiments of the present disclosure, the relationship between an arrangement pattern of an information code in a captured image containing the information code and a predetermined arrangement pattern for performing a display control associated with the information code is obtained. Thus, notification of the above-described relationship to the user is controlled.

With this, it is possible for the user to be readily aware of how an information code should be placed in a captured image to perform a display control in association with the information code. That is, it is possible to cause the arrangement pattern of the information code to be the arrangement pattern for performing the display control associated with the information code.

Furthermore, for example, the notification includes a notification of the relationship by displaying it on a display screen of the captured image.

With this, the user can reliably notice the notification while viewing the display screen of the captured image containing the information code.

Moreover, for example, the notification includes a notification of the relationship by displaying an object corresponding to the relationship on the display screen.

With this, it is possible for the user to know intuitively how the information code should be placed in the display screen of the captured image.

Furthermore, for example, the object may be an object that indicates the relationship.

It is possible for the user to know immediately how the information code should be placed by only viewing the object.

Moreover, for example, the object may be an object with a movement that indicates the relationship.

With this, it is possible for the user to know intuitively how the terminal device should be operated by viewing the movement of the object.

Furthermore, for example, the object may be an object having textual information which corresponds to the relationship.

With this, it is possible for the user to know reliably how the information code should be placed by reading the textual information.

Moreover, for example, the notification may include a notification of the relationship by displaying the captured image processed according to the relationship on the display screen.

With this, even when the user do not view a particular object, if the user views the display screen of the captured image, then it is possible for the user to know readily how the information code should be placed.

Furthermore, for example, a relationship is obtained between the arrangement pattern of the information code in the captured image and each of a plurality of predetermined arrangement patterns for performing the display control associated with the information code. In addition, the notification includes a notification of the relationship by displaying an arrangement pattern closer to the arrangement pattern of the information code in the captured image from among the plurality of predetermined arrangement patterns on the display screen.

With this, even when there are a plurality of predetermined arrangement patterns, it is possible for the user to know readily which arrangement pattern is closer to an arrangement pattern of the information code in a captured image. Thus, when the user places the information code in any one arrangement pattern of a plurality of predetermined arrangement pattern, it is possible for the user to know readily whether the arrangement pattern of the information code is close to a desired arrangement pattern.

Moreover, for example, the notification may include a notification of the relationship according to the degree of a predetermined operation for notifying the relationship.

With this, it is possible for the user to know readily whether the arrangement pattern of the information code is close to a predetermined arrangement pattern.

Furthermore, for example, the predetermined operation includes an audio output.

With this, when the user listen to the change in sound, it is possible for the user to know readily whether the arrangement pattern of the information code is close to the predetermined arrangement pattern. In addition, since there is no necessary to display anything on the display screen, the display on the display screen is not impaired.

Moreover, for example, the predetermined operation includes the vibration of a device.

With this, when the user feels the vibration of the terminal device 100, it is possible for the user to know readily whether the arrangement pattern of the information code is close to the predetermined arrangement pattern. In addition, since there is no necessary to display anything on the display screen, the display on the display screen is not impaired.

Furthermore, for example, the predetermined operation includes the change in display on the display screen of the captured image.

With this, when the user views the display screen of the captured image containing the information code, it is possible for the user to know readily whether the arrangement pattern of the information code is close to the predetermined arrangement pattern.

Moreover, for example, the arrangement pattern of the information code in the captured image includes a position of the information code in the captured image, and the predetermined arrangement pattern includes a predetermined position. In addition, the relationship includes a positional relationship between the position of the information code in the captured image and the predetermined position.

With this, it is possible for the user to know in which direction the position of the information code is deviated from the predetermined position for performing the display control associated with the information code. That is, it is possible for the user to know how the terminal device 100 should be moved in the horizontal direction or the vertical direction.

Furthermore, for example, the arrangement pattern of the information code in the captured image includes a size of the information code in the captured image, and the predetermined arrangement pattern includes a predetermined size. In addition, the relationship includes a size relationship between the size of the information code in the captured image and the predetermined size.

With this, it is possible for the user to know whether the size of the information code on the display screen of the captured image is deviated from a predetermined size for performing the display control associated with the information code. That is, the user can know whether the terminal device 100 should be closer to the information code or should be kept away from the information code.

Moreover, for example, the arrangement pattern of the information code in the captured image includes an angle of the information code in the captured image, and the predetermined arrangement pattern includes a predetermined angle. In addition, the relationship includes an angular relationship between the angle of the information code in the captured image and the predetermined angle.

With this, it is possible for the user to know whether the angle of the information code on the display screen of the captured image is deviated from a predetermined angle for performing the display control associated with the information code. That is, the user can know at what angle the terminal device 100 should be rotated.

Furthermore, for example, the predetermined arrangement pattern may be determined independently of the information code.

With this, a suitable predetermined arrangement pattern is determined depending on the information code, and thus it is possible to implement a desired display depending on the information code on the display screen. In addition, even when the predetermined arrangement pattern is changed depending on the information code, the convenience of notification of arrangement pattern relationship will be further enhanced.

Moreover, for example, the predetermined arrangement pattern is displayed on the display screen in the captured image.

With this, it is possible for the user to know how the information code should be placed on the display screen of the captured image.

Although the preferred embodiments of the present disclosure have been described in detail with reference to the appended drawings, the present disclosure is not limited to the above-described examples. It should be understood by those skilled in the art that various modifications, combinations, sub-combinations and alterations may occur depending on design requirements and other factors insofar as they are within the scope of the appended claims or the equivalents thereof.

For example, some or all of the functions of the control unit of the terminal device may be implemented in the control unit of the server. In addition, conversely, some or all of the functions of the control unit of the server or stored information of the storage unit of the server may be implemented in the control unit and the storage unit of the terminal device, respectively. That is, in the exemplary embodiments of the present disclosure, the description has been made on the assumption that the information processing device according to the embodiment of the present disclosure is a terminal device, but the present disclosure is not limited thereto. That is, the information processing device according to the embodiment of the present disclosure may be a server.

The arrangement pattern in which the display control is performed in association with the information code is not limited to a position, size, angle, or combination thereof. The arrangement pattern may or may not include one or two of position, size, and angle. In addition, the arrangement pattern may include an element other than position, size, and angle.

The processing steps in the information process herein may not be necessarily performed in a time-series manner in accordance with the procedure described in the flowchart. For example, the processing steps in the information process may be performed in a different order from that described in the flowchart, and they may be performed in parallel.

Furthermore, it is possible to create a computer program that causes hardware such as a CPU, ROM, and RAM incorporated into the information processing device to perform the equivalent functions to the components of the information processing device described above. In addition, a storage medium to be used in storing such a computer program may be also provided.

Additionally, the present technology may also be configured as below.

(1) An apparatus including:

an imaging unit configured to capture a current image including an information code, the information code being arranged at an arrangement position corresponding to a location within the captured current image; and a control unit configured to determine a difference between a predetermined position and the arrangement position, wherein, when the determined difference is greater than a predetermined threshold, a notification is output to a user, based on the determined difference, to notify of the difference as a guide for adjusting a capturing position of the current image to thereby move the information code to a new arrangement position corresponding to a location of the predetermined position.

(2) The image processing apparatus according to (1), wherein the captured current image is displayed on a display unit.

(3) The image processing apparatus according to (1) or (2), wherein the predetermined threshold is substantially equal to 0.

(4) The image processing apparatus according to any one of (1) to (3), wherein, when the determined difference not greater than the predetermined threshold, a content associated with the information code is provided to be displayed.

(5) The image processing apparatus according to any one of (1) to (4), further including a display unit configured to display the captured current image.

(6) The image processing apparatus according to any one of (1) to (5), wherein the display unit displays a live display of images captured by the imaging unit, and the current image is updated continuously based on the captured images.

(7) The image processing apparatus according to any one of (1) to (6), wherein the predetermined position corresponds to a location of display upon the display unit.

(8) The image processing apparatus according to any one of (1) to (7), wherein a content associated with the information code is provided, by a server, to be displayed by the display unit, based on a data contained in the information code.

(9) The image processing apparatus according to any one of (1) to (7), wherein a content associated with the information code is provided by a server to be displayed, based on a data contained in the information code.

(10) The image processing apparatus according to any one of (1) to (9), wherein the control unit is further configured to detect a data contained in the information code.

(11) The image processing apparatus according to any one of (1) to (10), wherein, when the determined difference is not greater than the predetermined threshold, the content is displayed in accordance with executing a program associated with the detected data.

(12) The image processing apparatus according to any one of (1) to (11), wherein the predetermined position is determined based on the detected data.

(13) The image processing apparatus according to any one of (1) to (12), wherein the determined difference includes a positional difference between respective locations of the predetermined position and the arrangement position.

(14) The image processing apparatus according to any one of (1) to (13), wherein the determined difference includes a rotational difference between an orientation of the information code at the arrangement position and an orientation of the predetermined position.

(15) The image processing apparatus according to any one of (1) to (14), wherein the determined difference includes a size difference between a size of the information code captured within the current image and a size of the arrangement position.

(16) The image processing apparatus according to any one of (1) to (15), wherein the notification includes at least one of a visual notification, an audio notification, and a tactile notification.

(17) The image processing apparatus according to any one of (1) to (16), wherein the notification includes the visual notification and the visual notification is output by displaying, by a display unit, an image object indicating to the user a direction of movement from the information code to the predetermined position.

(18) The image processing apparatus according to any one of (1) to (17), wherein the image object is an arrow.

(19) The image processing apparatus according to any one of (1) to (18), wherein the notification includes the visual notification and the visual notification is output by displaying, by a display unit, a textual instruction indicating to the user an adjustment direction of the capturing position of the current image to thereby move the information code to the new arrangement position corresponding to the location of the predetermined position.

(20) The image processing apparatus according to any one of (1) to (19), wherein the notification includes the audio notification and the audio notification is output by playing an audible sound indicating to the user a relative distance between the arrangement position and the predetermined position based on a volume of the audible sound.

(21) The image processing apparatus according to any one of (1) to (20), wherein the volume of the audible sound is adjusted over a period of time of capturing a plurality of images by the imaging unit, such that a louder volume indicates a smaller relative distance between the arrangement position and the predetermined position.

(22) The image processing apparatus according to any one of (1) to (21), wherein the notification comprises the tactile notification and the tactile notification is output by outputting a vibration indicating to the user a relative distance between the arrangement position and the predetermined position based on a magnitude of the vibration.

(23) The image processing apparatus according to any one of (1) to (22), wherein the magnitude of the vibration is adjusted over a period of time of capturing a plurality of images by the imaging unit, such that a larger vibration indicates a smaller relative distance between the arrangement position and the predetermined position.

(24) The image processing apparatus according to any one of (1) to (23), wherein the notification comprises the visual notification and the visual notification is output by flickering a display of the captured image to indicate to the user a relative distance between the arrangement position and the predetermined position based on a frequency of the flickering.

(25) A method including:
capturing a current image including an information code, the information code being arranged at an arrangement position corresponding to a location within the captured current image;
determining a difference between a predetermined position and the arrangement position; and
outputting, when the determined difference is greater than a predetermined threshold, a notification to a user, based on the determined difference, to notify of the difference as a guide for adjusting a capturing position of the current image to thereby move the information code to a new arrangement position corresponding to a location of the predetermined position.

(26) A non-transitory computer-readable medium embodied with a program, which when executed by a computer, causes the computer to perform a method, the method including:
capturing a current image including an information code, the information code being arranged at an arrangement position corresponding to a location within the captured current image;
determining a difference between a predetermined position and the arrangement position; and outputting, when the determined difference is greater than a predetermined threshold, a notification to a user, based on the determined difference, to notify of the difference as a guide for adjusting a capturing position of the current image to thereby move the information code to a new arrangement position corresponding to a location of the predetermined position.

Additionally, the present technology may also be configured as below.

(1)

An information processing device including:

an acquisition unit configured to acquire a relationship between an arrangement pattern of an information code in a captured image including the information code and a predetermined arrangement pattern for performing a display control associated with the information code; and a control unit configured to control a notification of the relationship to a user.

(2)

The information processing device according to (1), wherein the notification includes a notification of the relationship on the display screen of the captured image.

(3)

The information processing device according to (2), wherein the notification includes a notification of the relationship performed by displaying an object corresponding to the relationship on the display screen.

(4)

The information processing device according to (3), wherein the object is an object indicating the relationship.

(5)

The information processing device according to (3), wherein the object is an object with a movement indicating the relationship.

(6)

The information processing device according to (3), wherein the object is an object having textual information corresponding to the relationship.

(7)

The information processing device according to (2), wherein the notification includes a notification of the relationship performed by displaying the captured image processed according to the relationship on the display screen.

(8)

The information processing device according to any one of (2) to (7), wherein the acquisition unit acquires a relationship between the arrangement pattern of the information code in the captured image and each of a plurality of predetermined arrangement patterns for performing a display control associated with the information code, and wherein the notification includes a notification of the relationship performed by displaying an arrangement pattern closer to the arrangement pattern of the information code in the captured image from among the plurality of predetermined arrangement patterns on the display screen.

(9)

The information processing device according to (1), wherein the notification includes a notification of the relationship performed according to a degree of a predetermined operation for notifying the relationship.

(10)

The information processing device according to (9), wherein the predetermined operation includes an audio output.

(11)

The information processing device according to (9) or (10), wherein the predetermined operation includes a vibration of the device.

(12)

The information processing device according to any one of (9) to (11), wherein the predetermined operation includes a change in display on a display screen of the captured image.

(13)

The information processing device according to any one of (1) to (12), wherein the arrangement pattern of the information code in the captured image includes a position of the information code in the captured image, wherein the predetermined arrangement pattern includes a predetermined position, and wherein the relationship includes a positional relationship between the position of the information code in the captured image and the predetermined position.

(14)

The information processing device according to any one of (1) to (13), wherein the arrangement pattern of the information code in the captured image includes a size of the information code in the captured image, wherein the predetermined arrangement pattern includes a predetermined size, and wherein the relationship includes a size relationship between the size of the information code in the captured image and the predetermined size.

(15)

The information processing device according to any one of (1) to (14), wherein the arrangement pattern of the information code in the captured image includes an angle of the information code in the captured image, wherein the predetermined arrangement pattern includes a predetermined angle, and wherein the relationship includes an angular relationship between the angle of the information code in the captured image and the predetermined angle.

(16)

The information processing device according to any one of (1) to (15), wherein the predetermined arrangement pattern is determined independently for the information code.

(17)

The information processing device according to (16), wherein the acquisition unit acquires data contained in the information code, and wherein the control unit determines an arrangement pattern corresponding to the data as the predetermined arrangement pattern.

(18)

The information processing device according to any one of (1) to (17), wherein the predetermined arrangement pattern is displayed on a display screen of the captured image.

(19)

A program for causing a computer to functions as:

an acquisition unit configured to acquire a relationship between an arrangement pattern of an information code in a captured image including the information code and a predetermined arrangement pattern for performing a display control associated with the information code; and a control unit configured to control a notification of the relationship to a user.

(20)
An information processing method including:
acquiring a relationship between an arrangement pattern of an information code in a captured image including the information code and a predetermined arrangement pattern for performing a display control associated with the information code; and
controlling a notification of the relationship to a user.

REFERENCE SIGNS LIST 20 information code
40 display screen of captured image
50 object indicating predetermined arrangement pattern
100 terminal device
110 imaging unit
120 communication unit
130 storage unit
140 display unit
150 audio output unit
160 vibration unit
170 control unit
200 server
210 communication unit
220 storage unit
230 control unit

The invention claimed is:

1. An apparatus comprising:
an imaging unit configured to capture a current image including an information code, the information code being arranged at an arrangement position corresponding to a location within the captured current image; and
a control unit configured to determine a difference between a predetermined position and the arrangement position, wherein the information code is arranged within an area associated with the predetermined position or not within the area associated with the predetermined position,
wherein, when the determined difference is greater than a predetermined threshold, a notification is output to a user, based on the determined difference, to notify of the difference as a guide for adjusting a capturing position of the current image to thereby move the information code to a new arrangement position corresponding to a location of the predetermined position, and
wherein the imaging unit and the control unit are each implemented via at least one processor.

2. The apparatus of claim 1, wherein the captured current image is displayed on a display.

3. The apparatus of claim 1, wherein the difference between the predetermined position and the arrangement position is represented by a numerical value, and
wherein the predetermined threshold is substantially equal to 0.

4. The apparatus of claim 1, wherein, when the determined difference is not greater than the predetermined threshold, a content associated with the information code is provided to be displayed.

5. The apparatus of claim 1, further comprising:
a display unit configured to display the captured current image,
wherein the display unit is implemented via at least one processor.

6. The apparatus of claim 5, wherein the display unit displays a live display of images captured by the imaging unit, and the current image is updated continuously based on the captured images.

7. The apparatus of claim 5, wherein the predetermined position corresponds to a location of display upon the display unit.

8. The apparatus of claim 5, wherein
a content associated with the information code is provided, by a server, to be displayed by the display unit, the content being provided based on a data contained in the information code.

9. The apparatus of claim 1, wherein
a content associated with the information code is provided by a server to be displayed, the content being provided based on a data contained in the information code.

10. The apparatus of claim 1, wherein the control unit is further configured to detect a data contained in the information code.

11. The apparatus of claim 10, wherein, when the determined difference is not greater than the predetermined threshold, the content is displayed in accordance with executing a program associated with the detected data.

12. The apparatus of claim 10, wherein the predetermined position is determined based on the detected data.

13. The apparatus of claim 1, wherein the determined difference comprises a positional difference between respective locations of the predetermined position and the arrangement position.

14. The apparatus of claim 1, wherein the determined difference comprises a rotational difference between an orientation of the information code at the arrangement position and an orientation of the predetermined position.

15. The apparatus of claim 1, wherein the determined difference comprises a size difference between a size of the information code captured within the current image and a size of the arrangement position.

16. The apparatus of claim 1, wherein the notification comprises at least one of a visual notification, an audio notification, and a tactile notification.

17. The apparatus of claim 16, wherein the notification comprises the visual notification and the visual notification is output by displaying, by a display unit, an image object indicating to the user a direction of movement from the information code to the predetermined position, and
wherein the display unit is implemented via at least one processor.

18. The apparatus of claim 17, wherein the image object is an arrow.

19. The apparatus of claim 16, wherein the notification comprises the visual notification and the visual notification is output by displaying, by a display unit, a textual instruction indicating to the user an adjustment direction of the capturing position of the current image to thereby move the information code to the new arrangement position corresponding to the location of the predetermined position, and
wherein the display unit is implemented via at least one processor.

20. The apparatus of claim 16, wherein the notification comprises the audio notification and the audio notification is output by playing an audible sound indicating to the user a relative distance between the arrangement position and the predetermined position based on a volume of the audible sound.

21. The apparatus of claim 20, wherein the volume of the audible sound is adjusted over a period of time of capturing a plurality of images by the imaging unit, such that a louder volume indicates a smaller relative distance between the arrangement position and the predetermined position.

22. The apparatus of claim 16, wherein the notification comprises the tactile notification and the tactile notification is output by outputting a vibration indicating to the user a relative distance between the arrangement position and the predetermined position based on a magnitude of the vibration.

23. The apparatus of claim 22, wherein the magnitude of the vibration is adjusted over a period of time of capturing a plurality of images by the imaging unit, such that a larger vibration indicates a smaller relative distance between the arrangement position and the predetermined position.

24. The apparatus of claim 16, wherein the notification comprises the visual notification and the visual notification is output by flickering a display of the captured image to indicate to the user a relative distance between the arrangement position and the predetermined position based on a frequency of the flickering.

25. A method comprising:
   capturing a current image including an information code, the information code being arranged at an arrangement position corresponding to a location within the captured current image;
   determining a difference between a predetermined position and the arrangement position, wherein the information code is arranged within an area associated with the predetermined position or not within the area associated with the predetermined position; and
   outputting, when the determined difference is greater than a predetermined threshold, a notification to a user, based on the determined difference, to notify of the difference as a guide for adjusting a capturing position of the current image to thereby move the information code to a new arrangement position corresponding to a location of the predetermined position.

26. A non-transitory computer-readable medium embodied with a program, which when executed by a computer, causes the computer to perform a method, the method comprising:
   capturing a current image including an information code, the information code being arranged at an arrangement position corresponding to a location within the captured current image;
   determining a difference between a predetermined position and the arrangement position, wherein the information code is arranged within an area associated with the predetermined position or not within the area associated with the predetermined position; and
   outputting, when the determined difference is greater than a predetermined threshold, a notification to a user, based on the determined difference, to notify of the difference as a guide for adjusting a capturing position of the current image to thereby move the information code to a new arrangement position corresponding to a location of the predetermined position.

* * * * *